United States Patent
Peglow et al.

(10) Patent No.: US 7,811,642 B2
(45) Date of Patent: *Oct. 12, 2010

(54) POLYMERIZABLE DICHROMOPHORIC DICHROIC AZO DYES

(75) Inventors: Thomas Peglow, Lörrach (DE); Zoubair Cherkaoui, Niederdorf (CH); Franco Moia, Frenkendorf (CH)

(73) Assignee: Rolic AG, Zug (CH)

( * ) Notice: Subject to any disclaimer, the term of this patent is extended or adjusted under 35 U.S.C. 154(b) by 608 days.

This patent is subject to a terminal disclaimer.

(21) Appl. No.: 11/579,549

(22) PCT Filed: Apr. 26, 2005

(86) PCT No.: PCT/CH2005/000233

§ 371 (c)(1),
(2), (4) Date: Feb. 7, 2007

(87) PCT Pub. No.: WO2005/105932

PCT Pub. Date: Nov. 10, 2005

(65) Prior Publication Data

US 2008/0001120 A1    Jan. 3, 2008

(30) Foreign Application Priority Data

May 4, 2004   (EP) .................... 04405280

(51) Int. Cl.
*C09B 44/08* (2006.01)
*C09K 19/60* (2006.01)
*C09K 19/22* (2006.01)
*C08F 126/02* (2006.01)
*C08F 132/08* (2006.01)
*C08G 63/44* (2006.01)
*G02B 5/30* (2006.01)

(52) U.S. Cl. .............. 428/1.1; 428/1.2; 428/1.31; 252/299.01; 252/299.1; 252/299.68; 534/610; 534/612; 526/259; 528/363

(58) Field of Classification Search .......... 252/299.1, 252/299.68, 299.01; 526/259, 273; 528/363; 428/1.1, 1.2, 1.31; 534/610, 612
See application file for complete search history.

(56) References Cited

U.S. PATENT DOCUMENTS

| | | | | |
|---|---|---|---|---|
| 4,101,269 | A * | 7/1978 | Champenois | 526/259 |
| 5,789,556 | A * | 8/1998 | Kaneko et al. | 534/577 |
| 5,876,627 | A | 3/1999 | Kaneko et al. | |
| 7,419,620 | B2 * | 9/2008 | Buchecker et al. | 252/299.01 |
| 2004/0164272 | A1 * | 8/2004 | Buchecker et al. | 252/299.01 |
| 2006/0188663 | A1 * | 8/2006 | Peglow et al. | 428/1.1 |

FOREIGN PATENT DOCUMENTS

| | | | |
|---|---|---|---|
| EP | 0 787 783 A | 8/1997 |
| EP | 1 209 515 A | 5/2002 |
| EP | 1 256 602 A | 11/2002 |

* cited by examiner

*Primary Examiner*—Shean C Wu
(74) *Attorney, Agent, or Firm*—Sughrue Mion, PLLC

(57) ABSTRACT

The present invention is directed towards polymerizable dichromophoric dichroic azo dyes comprising azo-chromophores to which polymerizable groups are attached leading to dyes having sufficient solubility in combination with high coloring power and high order parameter.

58 Claims, No Drawings

POLYMERIZABLE DICHROMOPHORIC DICHROIC AZO DYES

The invention relates to new polymerizable dichromophoric dichroic azo dyes, mesogenic polymerizable mixtures containing the same and their use for the preparation of dichroic polymer networks and gels, which for instance may find application as uniform or patterned polarizers.

Many dyes have been developed for a variety of applications such as dyeing of fabrics, printing of textiles, coloring of plastics, color image formation in photography, etc. To provide the requisite properties, such as hue, solubility, affinity for the substrate, chemical resistance, and compatibility with the medium from which the dye is applied, the molecular structure and bond rigidity of the dye are specially designed for each application. Important properties required for the present application in mesogenic, polymerizable mixtures and dichroic polymer networks and gels, include the following: dichroism, solubility, high order parameter, coloring power and stability of the dichroic polymer.

Dichroism is the property whereby an oriented assembly of dye molecules exhibits relatively low absorption of a given wavelength of light in one state of orientation and a relatively high absorption of the same wavelength in another state of orientation with respect to the polarization direction of the light source. The orientation of the dye molecules can be brought about for example by dissolution in a solvent of liquid crystals or by embedding the dye in a stretched plastic.

Solubility must be sufficiently high so that thin layers, e.g. in the range of micrometers, may contain enough dye molecules to have adequate light absorption in one of the orientate states.

Order parameter is a quantitative measure of the degree of molecular order or alignment in a given system. High order parameter is promoted by dyes with elongated shape having a large ratio of molecular length to width, similar to the shape of molecules of the liquid crystal host material. To assure an elongated shape, the molecules should have a rigid structure, which can be obtained, for example, by a substantially linear arrangement of benzene or heterocyclic rings.

Brightness and contrast of dichroic polymer networks or gels are both related to the order parameter S of the dye, where $$S = D_\parallel - D_\perp / D_\parallel + 2 D_\perp$$

and $D_\parallel$ and $D_\perp$ are the optical densities of a dichroic dye in a liquid crystalline host material measured for light polarizations parallel and perpendicular to the liquid crystal director.

Preferably, the order parameter should exceed 0.7 and preferably should be as high as possible.

Coloring power of a dye is expressed by its extinction coefficient $\epsilon$. It is directly related to the economic viability of a dye. Also, it is of importance especially for the preparation of dye-containing mesogenic polymerizable mixtures and their use for the preparation of dichroic polymer networks and gels, as the concentration of the dye in the mesogenic host should be as low as possible in order to avoid a detrimental influence of the dye to the mesogenic properties of the host.

Stability of the dichroic polymer means that the properties of the polymer containing the dichroic dye should not alter during time due to diffusion processes or inhomogenicites caused by partial crystallization of the dye. It also means that the dichroic dyes should not migrate into adjacent layers if such polymers are designed for use in multilayer systems.

Various dichroic dyes have been proposed as materials, which fulfill partly the above-described requirements. There are, however, still drawbacks, which should be improved. In particular, those having high order parameters and/or high coloring power have poor solubility or cause instability of the dichroic polymer, and those showing good stability of the dichroic polymer do not have a high order parameter and/or a high coloring power. Thus, there is a need for a concept whereby preferably all or at least a suitable combination of the above-described requirements may be fulfilled.

With the forgoing in mind, the present inventors found that attaching two azo-chromophores to a linker leads to dyes combining very high order parameter, high coloring power and sufficient solubility, when at least one ring system, which increases the width of the molecule, is incorporated in the chromophore, and that the above described stability problem can be overcome if the dichroic dye contains polymerizable groups.

Thus, in a first aspect the present invention provides a polymerizable dichroic azo dye of the general formula I:

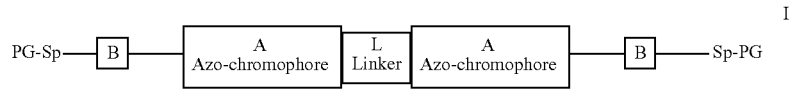

I wherein:

A represents a dichroic residue, exhibiting at least partial absorption in the visible region between 400 nanometer and 800 nanometer and comprising at least one azo-binding group that is linked to at least one radical of formula a) to g) shown below,

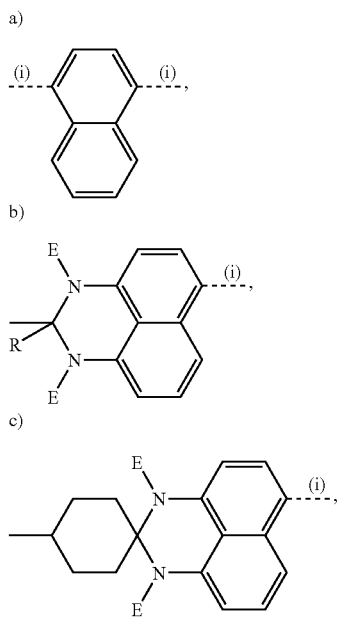

-continued d)
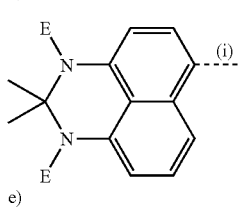

e)
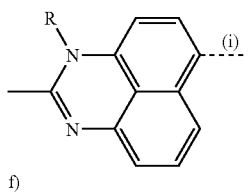

f)
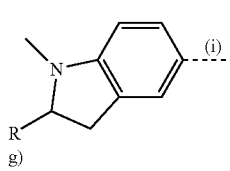

g)
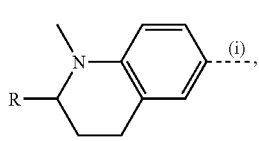

which radical of formula a) to g) may be unsubstituted, mono- or poly-substituted by fluorine, chlorine, hydroxy, —NR$^1$R$^2$ or by a straight chain or branched alkyl residue having 1-10 carbon atoms, which alkyl residue is unsubstituted, mono- or poly-substituted by fluorine, and wherein one or more of the non-adjacent CH$_2$ groups may independently be replaced by —O—, —CO—O—, —O—CO—, —NR$^1$—CO—, —CO—NR$^1$—, —NR$^1$—CO—O—, —O—CO—NR$^1$—, —CH=CH—, —C≡C—, —O—CO—O—, wherein R$^1$ and R$^2$ independently represent hydrogen or lower alkyl, wherein the broken lines (i) symbolize the possible linkages to the azo-binding group and wherein:

R represents hydrogen or lower alkyl;

E each independently represents hydrogen, lower alkyl, lower acyl or a polymerizable group selected from acryloyl or methacryloyl;

B represents a group of substructure II

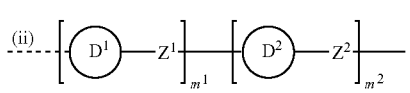
II wherein the broken line (ii) symbolizes the linkage to the azo-chromophore A and wherein D$^1$, D$^2$ each independently represents an aromatic or alicyclic group, which is unsubstituted or substituted by fluorine, chlorine, cyano, nitro, or by a straight chain or branched alkyl residue having 1-10 carbon atoms, which alkyl residue is unsubstituted, mono- or poly-substituted by fluorine and wherein one or more of the non-adjacent CH$_2$ groups may independently be replaced by Q, whereby Q represents —O—, —CO—, —CO—O—, —O—CO—, —Si(CH$_3$)$_2$—O—Si(CH$_3$)$_2$—, —NR—, —NR—CO—, —CO—NR—, —NR—CO—O—, —O—CO—NR—, —NR—CO—NR—, —CH=CH—, —C≡C—, —O—CO—O— and R has the meaning given above;

Z$^1$, Z$^2$ each independently represents a single covalent bond or a spacer unit, such as a straight-chain or branched alkylene residue, which is unsubstituted, mono-substituted by cyano or halogeno, or poly-substituted by halogeno, having 1 to 8 carbon atoms, wherein one or more of the non-adjacent CH$_2$ groups may independently be replaced by Q or —CR=C—CO—, wherein Q and R have the meaning given above;

m$^1$, m$^2$ independently are 0 or 1;

Sp represents a single covalent bond or a spacer unit, such as a straight-chain or branched alkylene residue, which is unsubstituted, mono-substituted by cyano or halogeno, or poly-substituted by halogeno, having 1 to 24 carbon atoms, wherein one or more of the non-adjacent CH$_2$ groups may independently be replaced by Q, wherein Q has the meaning given above;

L represents a group of substructure III

—X$^1$—(W)$_n$—X$^2$—   III wherein:

X$^1$, X$^2$ each independently represents a single covalent bond or a spacer unit, such as a straight-chain or branched alkylene residue, which is unsubstituted, mono-substituted by cyano or halogeno, or poly-substituted by halogeno, having 1 to 8 carbon atoms, wherein one or more of the non-adjacent CH$_2$ groups may independently be replaced by —O—, —CO—, —CO—O—, —O—CO—, —Si(CH$_3$)$_2$—O—Si(CH$_3$)$_2$—, —NE—, —NR—CO—, —CO—NR—, —NR—CO—O—, —O—CO—NR—, —NR—CO—NR—, —N=CR—, —CR=N—, —CH=CH—, —C≡C—, —O—CO—O— or —CR=C—CO—, wherein R and E have the meaning given above, wherein, of course, if n=0 and X$^1$ as well as X$^2$ are given as single covalent bond, the whole linker L is a single covalent bond;

W represents a spacer unit, such as a straight-chain or branched alkylene residue, which is unsubstituted, mono-substituted by cyano or halogeno, or poly-substituted by halogeno, having 1 to 24 carbon atoms, wherein one or more of the non-adjacent CH$_2$ groups may independently be replaced by Q, wherein Q has the meaning given above and wherein heteroatoms are not directly linked to each other, or an aromatic or alicyclic group, which is unsubstituted or substituted by fluorine, chlorine, cyano, nitro, or by a straight chain or branched alkyl residue having 1-10 carbon atoms, which alkyl residue is unsubstituted, mono- or poly-substituted by fluorine and wherein one or more of the non-adjacent CH$_2$ groups may be replaced by Q, wherein Q has the meaning given above, and n is 0 or 1 or, if two radicals of formula d) are attached to L, L represents a radical of formula h) to j) shown below, h)
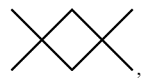

i)

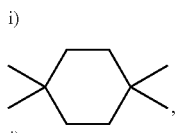

j)

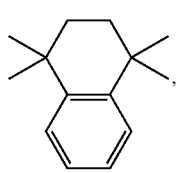

which radical of formula h) to j) may be unsubstituted, mono- or poly-substituted by fluorine, chlorine, hydroxy, —NR$^1$R$^2$ or by a straight chain or branched alkyl residue having 1-10 carbon atoms, which alkyl residue is unsubstituted, mono- or poly-substituted by fluorine, and wherein one or more of the non-adjacent CH$_2$ groups may independently be replaced by —O—, —CO—O—, —O—CO—, —NR$^1$—CO—, —CO—NR$^1$—, —NR$^1$—CO—O—, —O—CO—NR$^1$—, —CH═CH—, —C≡C—, —O—CO—O—, wherein R$^1$ and R$^2$ independently represent hydrogen or lower alkyl;

PG represents a polymerizable group.

It is understood that the term "dichroic residue" includes the pure chromophore system to which ring systems, additional polymerizable groups and/or spacer units may be attached [i.e. Group A of formula (I)].

It is understood that the term "aromatic" includes optionally substituted carbocyclic and heterocyclic groups comprising five-, six- or ten-membered ring systems, such as furane, benzene, pyridine, pyrimidine, naphthalene, or tetraline units.

It is understood that the term "alicyclic" includes non-aromatic carbocyclic or heterocyclic ring systems having 3 to 10 carbon atoms, such as cyclopropane, cyclobutane, cyclopentane, cyclopentene, cyclohexane, 1,3-dioxane, cyclohexene, cyclohexadiene and decaline.

It is understood that the phrase "straight chain or branched alkyl residue having 1-10 carbon atoms, which alkyl residue is unsubstituted, mono- or poly-substituted by fluorine, wherein one or more of the non-adjacent CH$_2$ groups may independently be replaced by Q" includes groups selected from the group comprising methyl, ethyl, propyl, isopropyl, butyl, isobutyl, sec-butyl, tert-butyl, pentyl, isopentyl, cyclopentyl, hexyl, cyclohexyl, heptyl, octyl, nonyl, decyl, 3-methylpentyl, allyl, but-3-en-1-yl, pent-4-en-1-yl, hex-5-en-1-yl, propynyl, butynyl, pentynyl, methoxy, ethoxy, propoxy, isopropoxy, butoxy, isobutoxy, sec-butoxy, tert-butoxy, pentyloxy, isopentyloxy, cyclopentyloxy, hexyloxy, cyclohexyloxy, heptyloxy, octyloxy, nonyloxy, 3-methylpentyloxy, allyloxy, but-3-enyloxy, pent-4-enyloxy, cylohexylmethoxy, cyclopentylmethoxy, methoxycarbonyl, ethoxycarbonyl, propoxy-carbonyl, isopropoxycarbonyl, butoxycarbonyl, isobutoxycarbonyl, sec-butoxy-carbonyl, tert-butoxycarbonyl, pentyloxycarbonyl, isopentyloxycarbonyl, cyclopentyloxy-carbonyl, hexyloxycarbonyl, cyclohexyloxycarbonyl, octyloxycarbonyl, nonyloxycarbonyl, 3-methylpentyloxycarbonyl, allyloxycarbonyl, but-3-enyloxycarbonyl, pent-4-en-yl-oxy-carbonyl, cyclohexylmethoxycarbonyl, cyclopentylmethoxycarbonyl, acetoxy, ethylcarbonyloxy, propylcarbonyloxy, isopropylcarbonyloxy, butylcarbonyloxy, isobutylcarbonyloxy, sec-butylcarbonyloxy, tert-butylcarbonyloxy, pentylcarbonyloxy, isopentylcarbonyloxy, cyclopentylcarbonyloxy, hexylcarbonyloxy, cyclohexylcarbonyloxy, octylcarbonyloxy, nonylcarbonyloxy, 3-methylpentylcarbonyloxy, but-3-enyloxy, pent-4-enyloxy, acetyl, ethylcarbonyl, propylcarbonyl, isopropylcarbonyl, butylcarbonyl, isobutylcarbonyl, sec-butylcarbonyl, pentylcarbonyl, isopentylcarbonyl, cyclohexylcarbonyl, octyl, carbonyl, nonylcarbonyl, methoxyacetoxy, 1-methoxy-2-propoxy, 3-methoxy-1-propoxy, 2-methoxyethoxy, 2-isopropoxyethoxy, 1-ethoxy-3-pentyloxy, 3-butynyloxy, 4-pentynyloxy, 5-chloropentynyl, 4-pentynecarbonyloxy, 6-propyloxyhexyl, 6-propyloxyhexyloxy, 2-fluoroethyl, trifluoromethyl, 2,2,2-trifluoroethyl, 1H,1H-pentadeca-fluorooctyl, 1H,1H,7H-dodecafluoroheptyl, 2-(perfluorooctyl)ethyl, 2-(perfluorobutyl)ethyl, 2-(perfluorohexyl)ethyl, 2-(perfluorodecyl)ethyl, perfluoropropyl, perfluorobutyl, perfluoroheptyl, perfluorooctyl, perfluorononyl. 1-fluoropropoxy, 1-fluoropentyloxy, 2-fluoropropoxy, 2,2-difluoropropoxy, 3-fluoropropoxy, 3,3-difluoropropoxy, 3,3,3-trifluoropropoxy, trifluoromethoxy or variations thereof.

It is understood that the term "lower alkyl" includes straight chain and branched hydrocarbon radicals having 1 to 6 carbon atoms, preferably 1 to 3 carbon atoms. Methyl, ethyl, propyl and isopropyl groups are especially preferred.

It is understood that the term "lower acyl" includes acetyl, propionyl, butyryl and isobytyryl groups. Acetyl is especially preferred.

It is understood that the term "halogeno" includes fluoro, chloro, bromo and iodo, preferably fluoro and chloro.

It is understood that the term "optionally substituted" includes optionally mono-substituted by lower alkyl, nitro, cyano or halogeno or poly-substituted by lower alkyl and/or cyano and/or halogeno.

The dichroic residue A may preferably be selected from the groups according to general formula IV:

IV

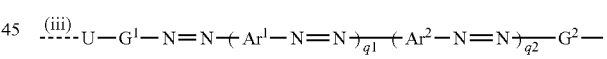

wherein the broken line (iii) symbolizes the linkage to the group B and wherein

Ar$^1$, Ar$^2$ independently of each other are 1,4-phenylene, 1,4- or 1,5-naphthylene, which are unsubstituted, mono- or poly-substituted by fluorine, chlorine, hydroxy, —NR$^1$R$^2$ or by a straight chain or branched alkyl residue having 1-10 carbon atoms, which alkyl residue is unsubstituted, mono- or poly-substituted by fluorine, and wherein one or more of the non-adjacent CH$_2$ groups may independently be replaced by Q, wherein Q has the meaning given above and R$^1$ and R$^2$ independently represent hydrogen or lower alkyl;

q$^1$, q$^2$ independently are 0 or 1;

G$^1$, G$^2$ represent independently of each other 1,4-phenylene, 2,4-thiazolene, 2,5-thiazolene or a group of formula a1) to g)

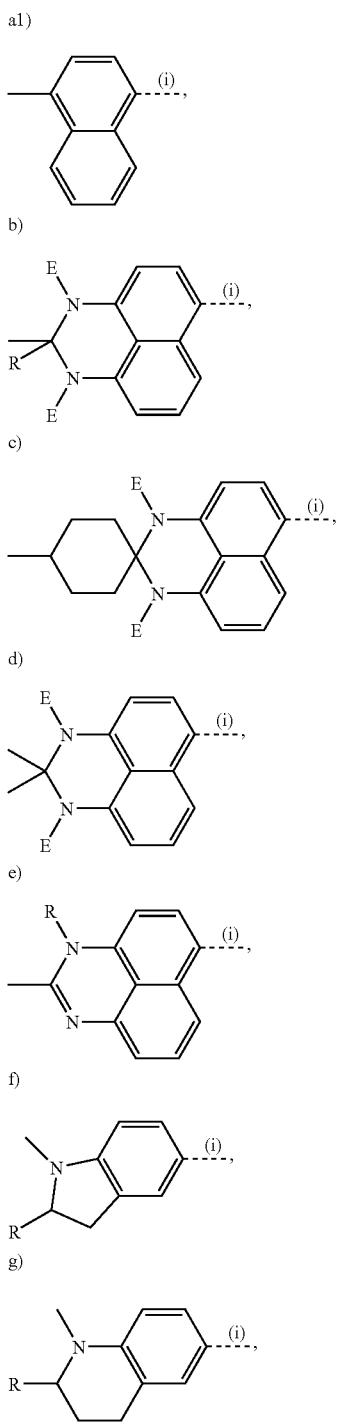

which 1,4-phenylene, 2,4-thiazolene, 2,5-thiazolene and groups of formula a1) to g) are unsubstituted, mono- or poly-substituted by fluorine, chlorine, hydroxy, —NR$^1$R$^2$ or by a straight chain or branched alkyl residue having 1-10 carbon atoms, which alkyl residue is unsubstituted, mono- or poly-substituted by fluorine, and wherein one or more of the non-adjacent CH$_2$ groups may independently be replaced by —O—, —CO—O—, —O—CO—, —NR$^1$—CO—, —CO—NR$^1$—, —NR$^1$—CO—O—, —O—CO—NR$^1$—, —NR$^1$—, —CH=CH—, —C≡C—, —O—CO—O—, wherein R$^1$ and R$^2$ independently represent hydrogen or lower alkyl, with the proviso that G$^1$ is not a group of formula d) and wherein the broken lines (i) symbolize the linkage to the azo-binding group and R, E have the meaning given above;

U represents a single covalent bond or a spacer unit, such as a straight-chain or branched alkylene residue, which is unsubstituted, mono-substituted by cyano or halogeno, or poly-substituted by halogeno, having 1 to 8 carbon atoms, wherein one or more of the non-adjacent CH$_2$ groups may independently be replaced by —O—, —CO—, —CO—O—, —O—CO—, —Si(CH$_3$)$_2$—O—Si(CH$_3$)$_2$—, —NE-, —NR—CO—, —CO—NR—, —NR—CO—O—, —O—CO—NR—, —NR—CO—NR—, —N=CR—, —CR=N—, —N=CR—, —CR=N—, —CH=CH—, —C≡C—, —O—CO—O— or —CR=C—CO— and R and E have the meaning given above;

with the proviso that if G$^1$ and G$^2$ are optionally substituted 1,4-phenylene, 2,4-thiazolene or 2,5-thiazolene at least one of Ar$^1$ or Ar$^2$ is optionally substituted 1,4-naphthylene.

Polymerizable groups PG are each independently preferably selected from the formulae CH$_2$=CY—, CH$_2$=CY—COO—, CH$_2$=CH—CO—NH—, CH$_2$=C(Ph)-CO—NH—, CH$_2$=CH—O—, CH$_2$=CH—OOC—, Ph-CH=CH—, CH$_2$=CH-Ph-, CH$_2$=CH-Ph-O—, CH$_2$=CH-Ph-OCO—, R$^3$-Ph-CH=CH—COO—, R$^2$—OOC—CH=CH-Ph-O—, N-maleinimidyl,

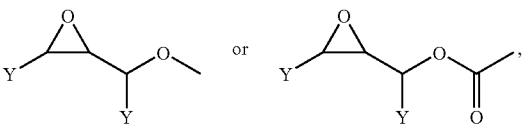

wherein Y each independently represents hydrogen, chloro or methyl, R$^2$ is hydrogen or lower alkyl, R$^3$ is hydrogen or lower alkoxy, Ph- is phenyl and -Ph- is 1,4-phenylene.

Particularly preferred groups PG include CH$_2$=CY—, CH$_2$=CY—COO—, CH$_2$=CH—O—, CH$_2$=CH—OOC—, CH$_2$=CH-Ph-O—, CH$_2$=CH-Ph-OCO—,

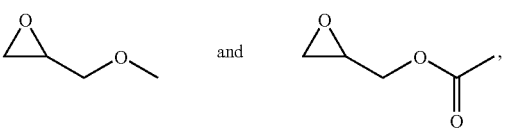

wherein Y is hydrogen or methyl.

Most preferred groups PG include CH$_2$=CY—COO—, CH$_2$=CH—O—, CH$_2$=CH—OOC—,

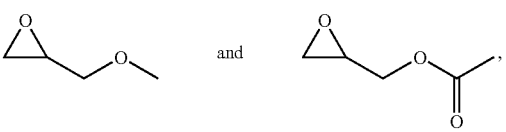

wherein Y is hydrogen or methyl.

It is understood that the term "lower alkoxy" includes straight chain and branched hydrocarbonoxy radicals having 1 to 6 carbon atoms, preferably 1 to 3 carbon atoms. Methoxy, ethoxy, propoxy and isopropoxy groups are especially preferred.

Preferred rings $D^1$ and $D^2$ independently of each other are unsubstituted, saturated five- or six-membered alicyclic rings or six- or ten-membered aromatic rings, which are unsubstituted, mono- or poly-substituted by fluorine, chlorine or nitro or by a straight chain or branched alkyl residue having 1-6 carbon atoms, which alkyl residue is unsubstituted, mono- or poly-substituted by fluorine, and wherein one or more of the non-adjacent $CH_2$ groups may independently be replaced by —O—, —CO—O—, —O—CO—, —$NR^2$—CO—, —CO—$NR^2$—, —$NR^2$—CO—O—, —O—CO—$NR^2$—, —CH=CH—, —C≡C—, —O—CO—O—, wherein $R^2$ represents hydrogen or lower alkyl.

Particularly preferred rings $D^1$ and $D^2$ include unsubstituted cyclopentane-1,3-diyl, unsubstituted 1,3-dioxane-2,5-diyl, unsubstituted cyclohexane-1,4-diyl, unsubstituted naphtalene-2,6-diyl or 1,4-phenylene, which is unsubstituted, mono- or poly-substituted by fluorine or chlorine or by a straight-chain or branched alkyl residue having 1-3 carbon atoms, which alkyl residue is unsubstituted, mono- or poly-substituted by fluorine, and wherein one or more of the non-adjacent $CH_2$ groups may independently be replaced by —O—, —CO—O—, —O—CO—, —CH=CH—, —C≡C—.

Most preferred rings $D^1$ and $D^2$ are 1,4-phenylene, which is unsubstituted, mono- or poly-substituted by fluorine, chlorine, methyl, methoxy, acyl or —CO—O—$CH_3$.

Preferred "spacer units" Sp of the present invention include a single bond, or a straight-chain or branched alkylene grouping, such as —$(CH_2)_r$—, and also —$(CH_2)_r$—O—$(CH_2)_s$—, —$(CH_2)_r$—CO—O—$(CH_2)_s$—, —$(CH_2)_r$—O—CO—$(CH_2)_s$—, —$(CH_2)_r$—$NR^2$—CO—$(CH_2)_s$—, —$(CH_2)_r$—$NR^2$—CO—O—$(CH_2)_s$—, —$(CH_2CH_2)_u$—$(OCH_2CH_2)_v$—, wherein r and s are each an integer from 1 to 22 and the sum of r+s≦23, and wherein u is an integer from 1 to 10, v is an integer from 1 to 7 and the sum of u+v≦8, wherein $R^2$ represents hydrogen or lower alkyl, and which are attached to group B and the polymerizable group, respectively, such that heteroatoms are not directly linked to each other.

Particularly preferred "spacer units" Sp include a single bond or a $C_{1-14}$ straight-chain alkylene group, especially ethylene, propylene, butylene, pentylene, hexylene, heptylene, octylene, nonylene, decylene, undecylene, or dodecylene.

Preferred $Z^1$ and $Z^2$ groups each independently include a single covalent bond or a straight-chain or branched alkylene residue, which is unsubstituted, mono-substituted or poly-substituted by fluoro, having 1 to 8 carbon atoms, wherein one or more of the non-adjacent $CH_2$ groups may independently be replaced by —O—, —CO—, —CO—O—, —O—CO—, —$NR^2$—CO—, —CO—$NR^2$—, —$NR^2$—CO—O—, —O—CO—$NR^2$—, —CH=CH—, —C≡C—, —O—CO—O—, —$CR^2$=C—CO—, wherein $R^2$ represents hydrogen or lower alkyl.

Particularly preferred $Z^1$ and $Z^2$ groups each independently include a single covalent bond or a straight-chain or branched alkylene residue, having 1 to 4 carbon atoms, wherein one or more of the non-adjacent $CH_2$ groups may independently be replaced by —O—, —CO—O—, —O—CO—, —CH=CH—, —C≡C—, —O—CO—O—, —$CR^2$=C—CO—, wherein $R^2$ represents hydrogen or lower alkyl.

It is most preferred that $Z^1$ and $Z^2$ are each independently selected from a group consisting of a single covalent bond, —O—, —CO—O—, —O—CO—, —$CH_2$—O— or —O—$CH_2$—.

Preferred E groups include hydrogen, methyl, acetyl, acryloyl and methacryloyl.

Particularly preferred E groups include hydrogen, methyl and acetyl.

It is preferred that the sum of the integers $q^1+q^2$ is 0 or 1.

It is preferred that W is a straight-chain or branched alkylene grouping, such as —$(CH_2)_r$—, and also —$(CH_2)_r$—O—$(CH_2)_s$—, —$(CH_2)_r$—CO—O—$(CH_2)_s$—, —$(CH_2)_r$—O—CO—$(CH_2)_s$—, —$(CH_2)_r$—$NR^2$—CO—$(CH_2)_s$—, —$(CH_2)_r$—$NR^2$—CO—O—$(CH_2)_s$—, —$(CH_2CH_2)_u$—$(OCH_2CH_2)_v$—, wherein r and s are each an integer from 1 to 22 and the sum of r+s≦23, and wherein u is an integer from 1 to 10, v is an integer from 1 to 7 and the sum of u+v≦8, and wherein $R^2$ represents hydrogen or lower alkyl, or an unsubstituted, saturated five- or six-membered alicyclic ring or six- or ten-membered aromatic ring, which is unsubstituted, mono- or poly-substituted by fluorine, chlorine or nitro or by a straight chain or branched alkyl residue having 1-6 carbon atoms, which alkyl residue is unsubstituted, mono- or poly-substituted by fluorine, and wherein one or more of the non-adjacent $CH_2$ groups may independently be replaced by —O—, —CO—O—, —O—CO—, —$NR^2$—CO—, —CO—$NR^2$—, —$NR^2$—CO—O—, —O—CO—$NR^2$—, —CH=CH—, —C≡C—, —O—CO—O—, wherein $R^2$ represents hydrogen or lower alkyl.

It is particularly preferred that W is a $C_{1-14}$ straight-chain alkylene group, especially ethylene, propylene, butylene, pentylene, hexylene, heptylene, octylene, nonylene, decylene, undecylene, or dodecylene; or 1,4-phenylene, 1,4-naphthylene, 1,5-naphthylene or 2,6-naphthylene, which are unsubstituted, mono- or poly-substituted by fluorine, chlorine, methyl, methoxy, acyl or —CO—O—$CH_3$.

It is preferred that $X^1$, $X^2$ and U when linked to 1,4-phenylene or 1,4-naphthylene each independently represent a single covalent bond, —CO—O—, —O—CO—, —$CH_2$—O—, —O—$CH_2$—, —NE-, —$CH_2$—NE-, —NE-$CH_2$—, —N=CR—, —CR=N—, —NR—CO— or —CO—NR—, and more preferably a single covalent bond, —CO—O—, —O—CO—, —$CH_2$—O—, —O—$CH_2$—, —NR— or —$CH_2$—NR—, —NR—$CH_2$—, —NR—CO— or —CO—NR—, wherein E and R have the meaning given above.

It is preferred that $X^1$, $X^2$ and U when linked to a group of formula b), c) or e) each independently represent a single covalent bond, —$CH_2$—$CH_2$—, —O—$CH_2$ ... (iv), —NE-$CH_2$ ... (iv), —CH=CH—, —O—$CH_2$—$CH_2$—$CH_2$ ... (iv) or —NE-$CH_2CH_2$—$CH_2$ ... (iv), more preferably a single covalent bond, —$CH_2$—$CH_2$—, —O—$CH_2$ ... (iv), —NR—$CH_2$ ... (iv), —CH=CH—, and most preferably a single covalent bond, —$CH_2$—$CH_2$— or —O—$CH_2$ ... (iv), wherein E and R have the meaning given above and the broken lines (iv) symbolize the linkage to the groups of formula b), c) or e).

It is preferred that $X^1$, $X^2$ and U when linked to a group of formula f) or g) each independently represent —$CH_2$—, —CO—, —$CH_2$—$CH_2$—$CH_2$—, —O—$CH_2$—$CH_2$ ... (iv), —NE-$CH_2$—$CH_2$ ... (iv), —CH=CH—$CH_2$ ... (iv), —OCO—$CH_2$ ... (iv) or —$CH_2$—OCO ... (iv), and more preferably —$CH_2$— or —CO—, wherein E has the meaning given above and the broken lines (iv) symbolize the linkage to the groups of formula f) or g).

It is preferred that L when linked to two groups of formula d) represents a radical of formula h) to j) shown below, h)

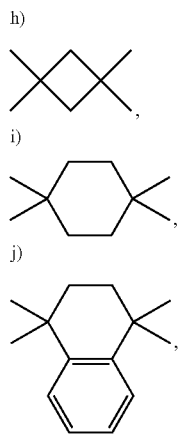

i)

j)

which are unsubstituted, mono- or poly-substituted by fluorine, chlorine, methyl, methoxy, acyl or —CO—O—CH₃ and more preferably a radical of formula i), which is unsubstituted, mono- or poly-substituted by methyl.

It is preferred that Ar¹ and Ar² independently of each other are 1,4-phenylene or 1,4-naphthylene, which are unsubstituted, mono- or disubstituted by fluorine, chlorine, —OCH₃ or —CH₃, with the proviso that at least one of Ar¹ or Ar² is optionally substituted 1,4-naphthylene if G¹ and G² are optionally substituted 1,4-phenylene.

It is especially preferred that Ar¹ and Ar² independently of each other are 1,4-phenylene, which is unsubstituted, mono- or disubstituted by chlorine or —CH₃ or unsubstituted 1,4-naphthylene, with the proviso that at least one of Ar¹ or Ar² is unsubstituted 1,4-naphthylene if G¹ and G² are optionally substituted 1,4-phenylene.

It is preferred that G¹ and G² independently of each other are 1,4-phenylene or 1,4-naphthylene, which are unsubstituted, mono- or disubstituted by fluorine, chlorine, —OCH₃ or —CH₃, preferably 1,4-phenylene, which is unsubstituted, mono- or disubstituted by chlorine or —CH₃ or unsubstituted 1,4-naphthylene;

or a group of formula b), c), d) and e), preferably a group of formula b), c) and d), which are unsubstituted and wherein the broken lines (i) symbolize the linkage to the azo-binding group and R, E have the meaning given above and with the proviso that G¹ does not represent a group of formula d)

b)

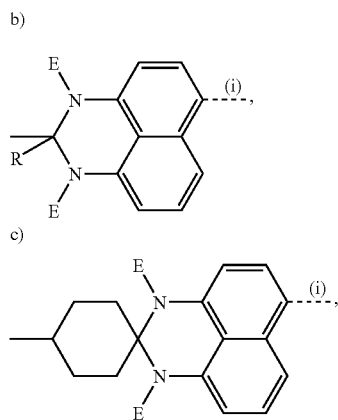

c)

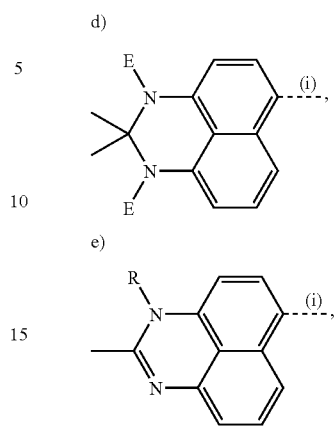

d)

e)

or a group of formula f) and g), which is unsubstituted and wherein the broken lines (i) symbolize the linkage to the azo-binding group and R represents hydrogen or lower alkyl f)

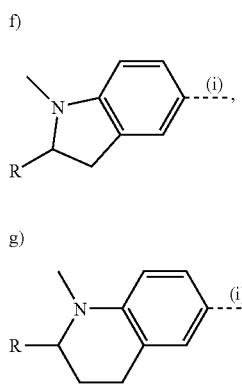

g)

It is especially preferred that G¹ and G² independently of each other are 1,4-phenylene or 1,4-naphthylene, which are unsubstituted, mono- or disubstituted by fluorine, chlorine, —OCH₃ or —CH₃, preferably 1,4-phenylene, which is unsubstituted, mono- or disubstituted by chlorine or —CH₃ or unsubstituted 1,4-naphthylene;

or a group of formula b), c), d) and e), preferably a group of formula b), c) and d), which are unsubstituted and wherein the broken lines (i) symbolize the linkage to the azo-binding group and R, E have the meaning given above and with the proviso that G¹ does not represent a group of formula d)

b)

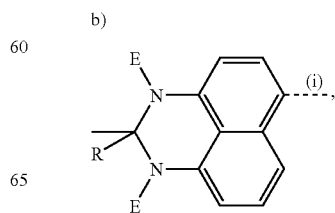

c)

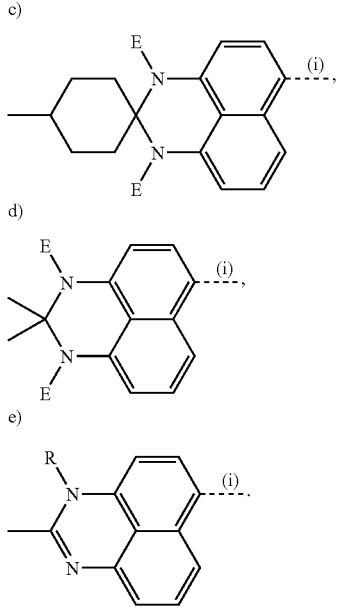

d)

e)

A further preferred embodiment of the present invention are polymerizable dichroic azo dyes according to the general formula I:

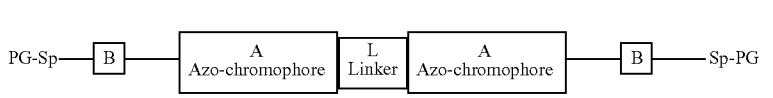

wherein:
A is a dichroic residue of general formulae IV:

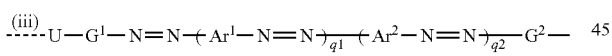

wherein the broken line (iii) symbolizes the linkage to the group B and wherein
G$^1$ and G$^2$ independently of each other represent 1,4-phenylene, which is unsubstituted, mono- or disubstituted by chlorine or —CH$_3$ or unsubstituted 1,4-naphthylene; or a group of formula b), c) and d)

b)

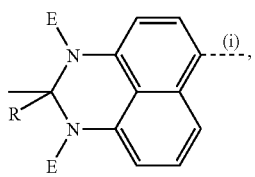

c)

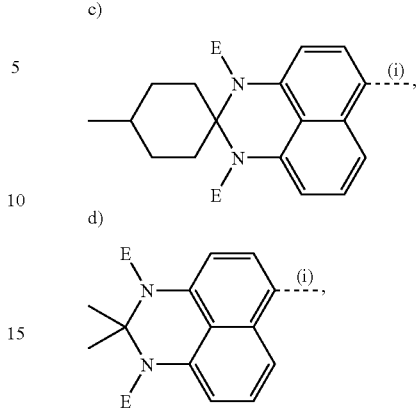

d)

wherein the broken lines (i) symbolize the linkage to the azo-binding group;
and wherein
R independently represents hydrogen, methyl, ethyl, propyl or isopropyl;
E independently represents hydrogen, methyl or acetyl;
and with the proviso that G$^1$ does not represent a group of formula d);
Ar$^1$, Ar$^2$ are independently of each other 1,4-phenylene, which is unsubstituted, mono- or disubstituted by chlorine or —CH$_3$ or unsubstituted 1,4-naphthylene, with the proviso that at least one of Ar$^1$ or Ar$^2$ is unsubstituted 1,4-naphthylene if G$^1$ and G$^2$ are optionally substituted 1,4-phenylene;
q$^1$, q$^2$ independently are 0 or 1, with the proviso that the sum of the integers q$^1$+q$^2$ is 0 or 1;
U when linked to 1,4-phenylene or 1,4-naphthylene represents a single covalent bond, —CO—O—, —O—CO—, —CH$_2$—O—, —O—CH$_2$—, —NR— or —CH$_2$—NR—, —NR—CH$_2$—, —NR—CO— or —CO—NR—, wherein E and R have the meaning given above, or when linked to a group of formula b) or c) represents a single covalent bond, —CH$_2$—CH$_2$— or —O—CH$_2$ . . . (iv), wherein E and R have the meaning given above and the broken lines (iv) symbolize the linkage to the groups of formula b) or c).
B represents a group of substructure II

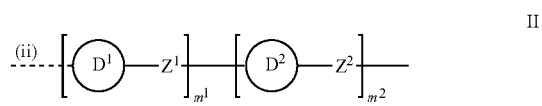

wherein the broken line (ii) symbolizes the linkage to the azo-chromophore A and wherein:

$D^1$ and $D^2$ independently of each other represent 1,4-phenylene, which is unsubstituted, mono- or poly-substituted by fluorine, chlorine, methyl, methoxy, acyl or —CO—O—CH$_3$;

$m^1$, $m^2$ are independently of each other 0 or 1;

$Z^1$ and $Z^2$ independently of each other represent a single covalent bond, —O—, —CO—O—, —O—CO—, —CH$_2$—O— or —O—CH$_2$—;

PG represents CH$_2$=CY—COO—, CH$_2$=CH—O—, CH$_2$=CH—OOC—,

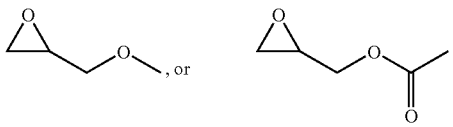

wherein Y is hydrogen or methyl;

Sp represents a single bond, ethylene, propylene, butylene, pentylene, hexylene, heptylene, octylene, nonylene, decylene, undecylene, or dodecylene;

L when linked to two groups of formula d) represents a radical of formula i) which is unsubstituted, mono- or poly-substituted by methyl i)

or represents a group of substructure III $$—X^1—(W)_n—X^2—\qquad\qquad III$$

wherein:

$X^1$ and $X^2$ when linked to 1,4-phenylene or 1,4-naphthylene each independently of each other represent a single covalent bond, —CO—O—, —O—CO—, —CH$_2$—O—, —O—CH$_2$—, —NR— or —CH$_2$—NR—, —NR—CH$_2$—, —NR—CO— or —CO—NR—, wherein E and R have the meaning given above, or when linked to a group of formula b) or c) each independently of each other represent a single covalent bond, —CH$_2$—CH$_2$— or —O—CH$_2$ . . . (iv), wherein E and R have the meaning given above and the broken lines (iv) symbolize the linkage to the groups of formula b) or c). Also here, of course, if n=0 and $X^1$ as well as $X^2$ are given as single covalent bond, the whole linker L is a single covalent bond.

W represents ethylene, propylene, butylene, pentylene, hexylene, heptylene, octylene, nonylene, decylene, undecylene, or dodecylene; or 1,4-phenylene, 1,4-naphthylene, 1,5-naphthylene or 2,6-naphthylene, which are unsubstituted, mono- or poly-substituted by fluorine, chlorine, methyl, methoxy, acyl or —CO—O—CH$_3$;

n is 0 or 1.

The polymerizable dichroic azo dyes of the invention, also hereinafter called dyes of the present invention, may readily be prepared using methods well known to the person skilled in the art, such as those documented in Houben-Weyl, *Methoden der Organischen Chemie*, Thieme-Verlag, Stuttgart.

A further aspect of the present invention also relates to mesogenic polymerizable mixtures comprising at least one polymerizable dichroic azo dye of formula (I). For the preparation of such mixtures, hereinafter also called mixtures of the invention, which may further be used for the preparation of dichroic polymer networks and gels, such as unstructured and structured polarizers, the dyes according to the present invention may be used singly. Alternatively, two or more of the dyes of the invention may also be used in combination. The number of dyes of the invention of formula I present in the prevailing host may depend mainly on the spectral working range of the polymer and on the solubility of the dyes. Colored polarizers, which are absorbing in a selective spectral range, may preferably be achieved by the presence of one or two dyes in the host. Black polarizers, selectively absorbing in the whole visible range, may preferably be achieved by the presence of three or more dyes.

Typically, the total content of the polymerizable dichroic azo dye of formula I according to the invention in the respective host, such as the mixtures of the invention, may depend on different factors such as solubility in the host and absorption ability (extinction) of the dyes involved. Preferred dye concentrations may be in the range of 0.01 to 50% wt, more preferably from 0.01 to 20% wt, most preferably from 0.01 to 10% wt.

In a further embodiment the mixtures of the invention may comprise in addition another dichroic or non-dichroic dye, which resulting mixture may be used as a dichroic dye of a desired color hue. No limitation is imposed in this context.

In a further embodiment the mesogenic, polymerizable mixtures comprising at least one polymerizable dichroic azo dye of this invention further comprise at least one polymerizable liquid crystalline compound (LCP). Polymerizable liquid crystalline compounds are well known to the skilled person and are described e.g. in EP 0331233, WO 95/24454, U.S. Pat. Nos. 5,567,349, 5,650,534, WO 00/04110, WO 00/07975, WO 00/48985, WO 00/55110 and WO 00/63154. For the adjustment of mesomorphic properties and suppression of crystallization, mixtures of two or more LCP components may also be used. The addition of isotropic compounds comprising two or more polymerizable groups, so called crosslinkers, may also be possible. Furthermore well known additives such as e.g. phenol derivatives for stabilization and photoinitiators such as e.g. Irgacure® may also be present in the mixture.

Thus, preferred mixtures of the invention comprise at least one polymerizable dichroic azo dye according to the general formula I and at least one polymerizable liquid crystalline compound and optionally additives, such as crosslinkers, stabilizers and photoinitiators.

Particularly preferred are mixtures of the invention comprising one to four polymerizable dichroic azo dyes of formula I and at least one polymerizable liquid crystalline compound comprising two polymerizable groups and optionally additives such as crosslinkers, stabilizers and photoinitiators.

The dichroic azo dyes according to the invention are also of value in the manufacture of dyed cholesteric layers. When added to a cholesteric mixture the dichroic azo dyes according to the invention are able to contribute to the enhancement of special color effects and therefore their further use in the formation of dyed cholesteric devices is an additional and valuable asset.

Thus in a preferred embodiment, mixtures of the invention as described hereinabove may further comprise either (i) at least one chiral polymerizable liquid crystalline compound or (ii) at least one chiral component, to induce a cholesteric phase for the creation of dyed cholesteric layers.

The mesogenic, polymerizable mixtures according to the present invention may further be used in the formation of dichroic polymer networks and gels. Dichroic polymer networks [hereinafter also called dichroic liquid crystalline polymer films (LCP films)] have been found to be of particular use and, thus, a further aspect the invention provides dichroic films comprising mesogenic polymerizable mixtures according to the present invention.

Such LCP films may readily be prepared by UV or thermal polymerization of the mixtures of the present invention. A film comprising a mixture according to the present invention is formed on a substrate, for example, by first preparing a solution by dissolving the mixture in a solvent, which is subsequently applied to a support by different coating techniques, such as spin-coating, meniscus-coating, wire-coating, slot-coating, offset-printing, flexo-printing, gravure-printing and inkjet-printing. After evaporation of the solvent, the resulting film is polymerized using UV light to give a cross-linked dichroic liquid crystalline polymer film of various thicknesses, preferably of 5 to 10 micrometer thickness, but also thicker films are possible. If required, such films may further be coated with other layers, such as e.g. protective layers for protection against oxygen, UV irradiation or mechanical stress. Such films may be used in the manufacture of devices such as polarizers or optical filters.

Examples of substrates used in the preparation of dichroic LCP films may include transparent substrates, such as glass or plastic, including an orientation layer, which is able to induce a uniform orientation to the mixture. Such orientation layers may include rubbed polyimide, or polyamide or preferably layers of photo-orientable materials. A well-suited kind of photo-orientable orientation layers are Linearly Photo-Polymerizable Polymers (LPPs), also sometimes referred to as Photo-Oriented Polymer Networks (PPN). Backgrounds and manufacturing of such orientation layers are disclosed in, for example, U.S. Pat. Nos. 5,389,698, 5,838,407, 5,602,661, 6,160,597, 6,144,428, 6,300,991 all of the applicant. Using LPP layers, segments (pixels) of locally varying orientation may be formed. Thus, not only uniformly aligned dichroic LCP layers but also structured complex orientation patterns within the dichroic LCP layers may be produced. Furthermore multilayer systems formed from stacks of alternating LPP and LCP layers, wherein at least one of the LCP layers is a dichroic LCP layer are feasible. Such layers or stack of layers may additionally be covered by other well known functional layers, such as, e.g. protection layers against oxygen or humidity or layers for protection against ultraviolet radiation.

Recently it has been shown, e.g. in WO 99/64924, that photo-orienting materials like LPPs may also be able to orient liquid crystalline compounds, such as LCPs, if they are admixed to the mixture to be oriented prior to illumination with polarized light. In this way, orientation layers and LCP layers need not be formed separately. Thus, an analogous preparation of a dichroic LCP film using a mixture of the invention, which in addition contains a photo-orientable material, is also be possible.

The dichroic mixtures and films of the present invention may be used to prepare electro-optical and optical devices including security devices. A further aspect of the invention therefore provides an electro-optical or optical component or a security device comprising a dichroic liquid crystalline polymer film formed from a mixture of the invention. Examples of optical or electro-optical components may include structured or unstructured optical filters, polarizers, etc. Security or authentication devices may for instance be used to safeguard banknotes, credit cards, securities, identity cards and the like against forgery and copying.

In another aspect, the invention provides an orientation layer containing at least one polymerizable dichroic azo dye according to formula I. Such orientation layers, which are able to induce a uniform orientation to a liquid crystalline mixture, may include rubbed polyimide, or polyamide or preferably photo-orientable materials. For instance orientation layers containing photo-orientable materials may readily be achieved by:

(i) preparing a solution of a mixture comprising at least one polymerizable dichroic azo dye of formula I and at least one photoorientable material in a solvent,
(ii) applying the solution on a substrate using different coating techniques,
(iii) evaporating the solvent to obtain a film, and
(iv) polymerizing said film using linearly polarized UV light to give said orientation layer comprising at least one polymerizable dichroic azo dye according to formula I.

Such dyed orientation layers can be used in the manufacture of optical or electro-optical components, which may include structured or unstructured optical filters, polarizers or elements of security devices.

The following non-limiting examples further describe the present invention. Variations on these falling within the scope of the invention will be apparent to a person skilled in the art.

Following abbreviations are used:

| DMAP | 4-Dimethylaminopyridine |
| DMF | N,N-Dimethylformamide |
| THF | Tetrahydrofuran |

For legibility reasons some of the molecular structures displayed hereinafter are graphically split into two parts. The intersected parts are connected via a single bond:

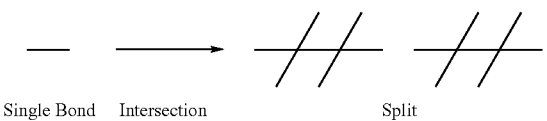

Single Bond    Intersection          Split

EXAMPLE 1

Preparation of 4-[({4-[(E)-(4-{(E)-[4-({4-[(E)-(4-{(E)-[4-({4-[(4-{[6-(methacryloyloxy)hexyl]oxy}benzoyl)oxy]benzyl}amino)-1-naphthyl]diazenyl}-1-naphthyl)diazenyl]benzoyl}oxy)phenyl]diazenyl}-1-naphthyl)diazenyl]-1-naphthyl}amino)methyl]phenyl 4-{[6-(methacryloyloxy)hexyl]oxy}benzoate

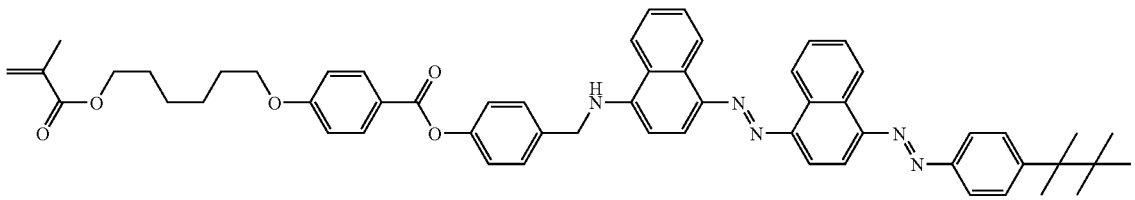

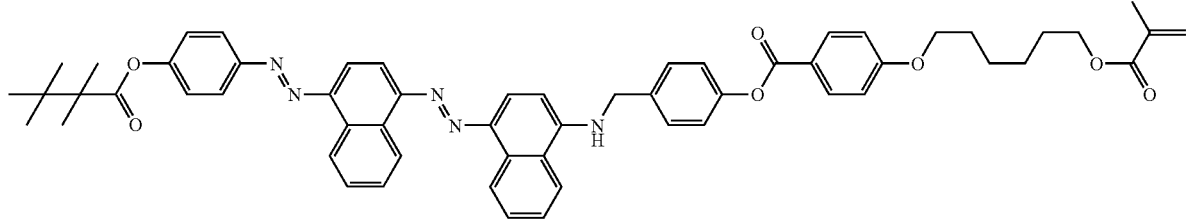

1) 4-nitrophenyl 4-nitrobenzoate

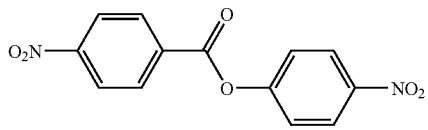

8.77 g of 4-nitrobenzoic acid (52.5 mM) were dissolved in 400 ml of THF and 53.1 g of triethylamine (525.0 mM). The solution was cooled to −30° C. and 6.01 g of methansulfochloride (52.5 mM) were added dropwise. The mixture was stirred for 1 h at this temperature, then 6.95 g of 4-nitrophenol (50.0 mM) were added at once, followed by 250 mg of DMAP. The reaction mixture was stirred for 1 h at −30° C. and was allowed to warm to room temperature while stirred overnight. The next day, the reaction mixture was filtered, the cake was washed with THF and the filtrate was evaporated to dryness. The residue was purified by chromatography using silica gel and dichloromethane to give 11.0 g (38.2 mM, 76%) of 4-nitrophenyl 4-nitrobenzoate as white crystals.

2) 4-aminophenyl 4-aminobenzoate

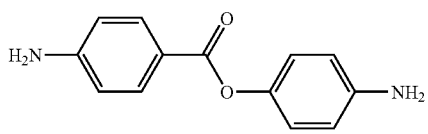

11.0 g of 4-nitrophenyl 4-nitrobenzoate (38.2 mM) were dissolved in 350 ml of ethyl acetate and 1.0 g of palladium on charcoal (10%) was added. The resulting mixture was hydrogenated at atmospheric pressure until the theoretical amount of hydrogen was consumed. The mixture was then filtered, the cake was washed with ethyl acetate and the filtrate was evaporated to dryness to give 8.71 g (38.2 mM, 99%) of 4-aminophenyl 4-aminobenzoate as slightly beige crystals.

3) 4-[(E)-(4-amino-1-naphthyl)diazenyl]phenyl 4-[(E)-(4-amino-1-naphthyl)diazenyl]benzoate

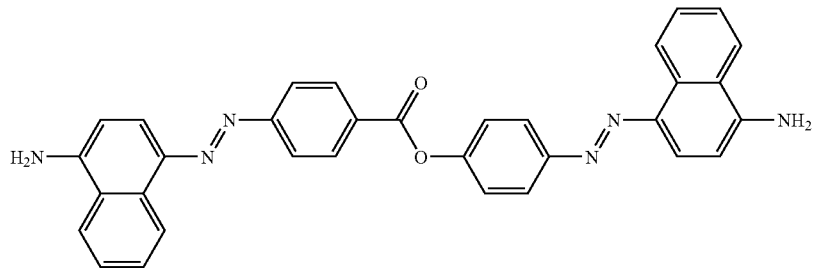

4.56 g of 4-aminophenyl 4-aminobenzoate (20.0 mM) were suspended in 140 ml of water and 25 ml of hydrochloric acid 37%. The suspension was cooled to 3° C. and a solution of 2.83 g of sodium nitrite (41.0 mM) in 10 ml of water was added dropwise. When the addition was complete, the mixture was stirred for 1 h at 3° C., then the excess of nitrite was destroyed by addition of ca. 0.5 g of amidosulfonic acid and the mixture was stirred for further 10 min. This diazo-solution was added to a solution of 5.73 g of 1-naphthylamine (40.0 mM) in 40 ml of ethanol at 5-10° C. When addition was complete, the coupling mixture was stirred for 1 h at 3° C., then 37.0 g of potassium acetate were added and stirring was continued for 0.5 h. The pH of this mixture was then adjusted to pH=7 by addition of ammonia solution 26%. The mixture was poured onto 800 ml of ice-water and the dark precipitate was filtered off, washed with water and dried to give 17.60 g of dark crystals. These crystals were boiled for 1 h in 150 ml of methanol, the formed suspension was cooled to room temperature and the solid was filtered off, washed with methanol and dried to give 6.60 g (12.3 mM, 61%) of 4-[(E)-(4-amino-1-naphthyl)diazenyl]phenyl 4-[(E)-(4-amino-1-naphthyl)diazenyl]benzoate as dark crystals.

4. 4-{(E)-[4-((E)-{4-[(4-hydroxybenzyl)amino]-1-naphthyl}diazenyl)-1-naphthyl]diazenyl)phenyl} 4-{(E)-[4-((E)-{4-[(4-hydroxybenzyl)amino]-1-naphthyl}diazenyl)-1-naphthyl]diazenyl}benzoate

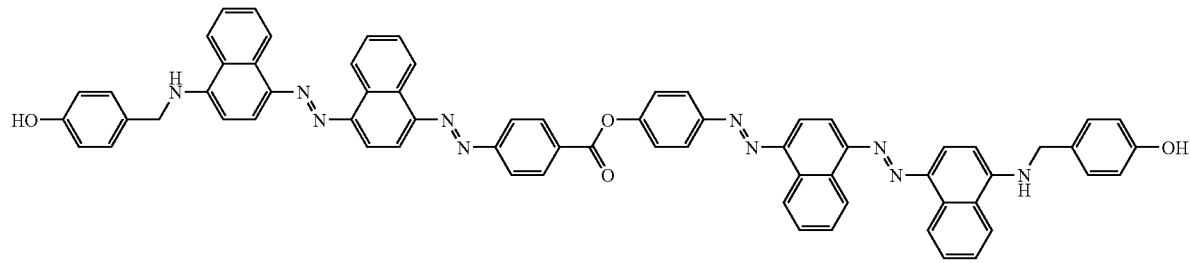

1.17 g of 4-[(E)-(4-amino-1-naphthyl)diazenyl]phenyl 4-[(E)-(4-amino-1-naphthyl)diazenyl]benzoate (2.18 mM) were dissolved in 10 ml of pyridine and 60 ml of glacial acetic acid. The solution was cooled to 5° C. and a solution of 0.31 g of sodium nitrite (4.40 mM) in 5 ml of water was added dropwise. When the addition was complete, the mixture was stirred for 1 h at 5° C., then the excess of nitrite was destroyed by addition of ca. 30 mg of amidosulfonic acid and the mixture was stirred for further 5 min. To this solution was added a solution of 1.09 g of 4-[(1-naphthylamino)methyl]phenol (4.40 mM) in 10 ml of DMF at 5° C. When addition was complete, the coupling mixture was stirred for 0.5 h at 5° C., then 0.5 h at 10-15° C. The reaction mixture was poured onto icewater and the dark precipitate was filtered off and dried to give 2.40 g of a black solid. This solid was dissolved in 25 ml of THF and to this solution were added dropwise 50 ml of methanol at room temperature. When addition was complete, the resulting suspension was stirred for 20 min. and then the solids were filtered off, washed with methanol and dried to give 0.97 g (0.92 mM, 42%) of 4-{(E)-[4-((E){4-[(4-hydroxybenzyl)amino]-1-naphthyl}diazenyl)-1-naphthyl]diazenyl}phenyl 4-{(E)-[4-((E)-{4-[(4-hydroxybenzyl)amino]-1-naphthyl}diazenyl)-1-naphthyl]diazenyl}benzoate as a black powder.

5) 4-[({4-[(E)-(4-{(E)-[4-({4-[(E)-4-{(E)-[4-({4-[(4-{[6-(methacryloyloxy)hexyl]oxy}benzoyl)oxy]benzyl}amino)-1-naphthyl]diazenyl}-1-naphthyl)diazenyl]benzoyl}oxy)phenyl]diazenyl}-1-naphthyl)diazenyl]-1-naphthyl}amino)methyl]phenyl 4-{[6-(methacryloyloxy)hexyl]oxy}benzoate

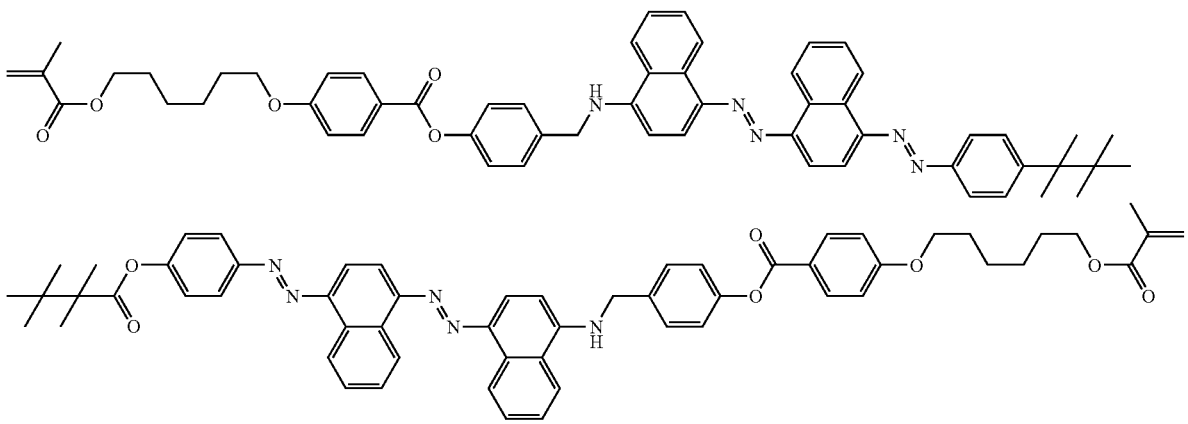

0.61 g of 4-{[6-(methacryloyloxy)hexyl]oxy}benzoic acid (2.0 mM) were dissolved in 30 ml of THF and 2.02 g of triethylamine (20.0 mM). The solution was cooled to −30° C. and 0.23 g of methansulfochloride (2.0 mM) were added dropwise. The mixture was stirred for 1 h during which the temperature was allowed to rise to −10° C. At this temperature, 0.85 g of 4-{(E)-[4-((E)-{4-[(4-hydroxybenzyl)amino]-1-naphthyl}diazenyl)-1-naphthyl]diazenyl}phenyl 4-{(E)-[4-((E)-{4-[(4-hydroxybenzyl)amino]-1-naphthyl}diazenyl)-1-naphthyl]diazenyl}benzoate (0.8 mM) were added at once, followed by 10 mg of DMAP. The reaction mixture was allowed to warm to room temperature while stirred overnight. The next day, the mixture was filtered through a pad of celite filter aid and evaporated to dryness. The residue was dissolved in 30 ml of THF and to this solution were added dropwise 25 ml of methanol at room temperature. When addition was complete, the resulting suspension was stirred for 1 h and then the solids were filtered off, washed with methanol and dried to give 0.70 g (0.43 mM, 54%) of 4-[({4-[(E)-(4-{(E)-[4-({4-[(E)-(4-{(E)-[4-({4-[(4-{[6-(methacryloyloxy)hexyl]oxy}benzoyl)oxy]benzyl}amino)-1-naphthyl]diazenyl}-1-naphthyl)diazenyl]benzoyl}oxy)phenyl]diazenyl}-1-naphthyl)diazenyl]-1-naphthyl}amino)methyl]phenyl 4-{[6-methacryloyloxy)hexyl]oxy}benzoate as a black powder, $\lambda_{max}$=574 nm, $\epsilon$=83000 (THF).

EXAMPLE 2

Preparation of 5-[(4-{(E)-[4-({4-[(4-{[6-(methacryloyloxy)hexyl]oxy}benzoyl)oxy]benzyl}amino)-1-naphthyl]diazenyl}benzoyl)oxy]-1-naphthyl 4-{(E)-[4-({4[(4-{[6-(methacryloyloxy)hexyl]oxy}benzoyl)oxy]benzyl}amino)-1-naphthyl]diazenyl}-benzoate

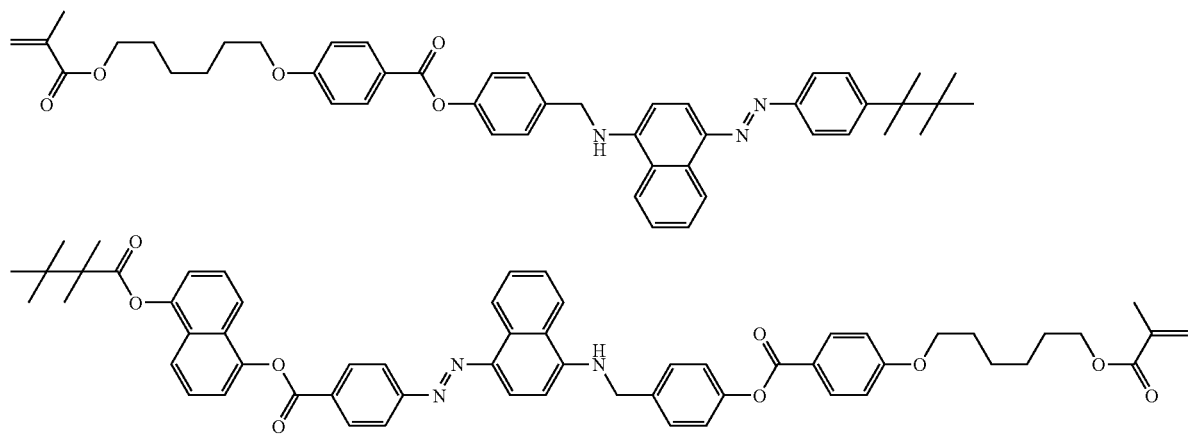

1) 5-[(4-nitrobenzoyl)oxy]-1-naphthyl 4-nitrobenzoate

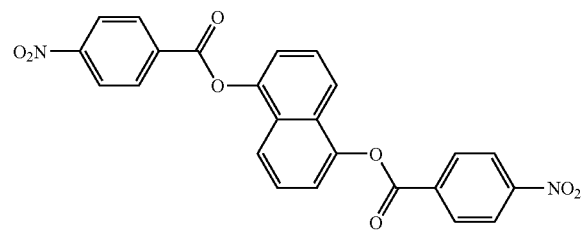

8.0 g of 1,5-dihydroxynaphtalene (50.0 mM) were dissolved in 150 ml of pyridine and the solution was cooled to 0° C. At this temperature were added portionwise 27.8 g of 4-nitrobenzoylchloride (150.0 mM), whereupon the temperature rose to Ca. 30° C. Then, 0.6 g of DMAP (5.0 mM) were added and the mixture was stirred overnight at 140° C. bath-temperature. The next day, the reaction mixture was allowed to cool to room temperature and 500 ml of water were added and the resulting mixture was stirred for 1 h at 140° C. bath-temperature. It was then cooled to room temperature and filtered. The cake was washed with water and dried to give 22.2 9 (48.4 mM, 97%) of 5-[(4-nitrobenzoyl)oxy]-1-naphthyl 4-nitrobenzoate as beige crystals.

2) 5-[(4-aminobenzoyl)oxy]-1-naphthyl 4-aminobenzoate

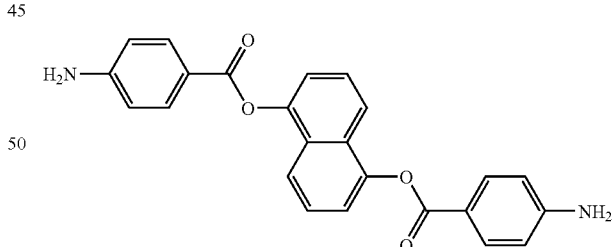

22.2 g of 5-[(4-nitrobenzoyl)oxy]-1-naphthyl 4-nitrobenzoate (48.4 mM) were suspended in 400 ml of DMF and 2.5 g of palladium on charcoal (10%) were added. The resulting mixture was hydrogenated at atmospheric pressure until the theoretical amount of hydrogen was consumed. The mixture was then filtered, the cake was washed with DMF and the filtrate was poured onto 4 L of water. The resulting suspension was stirred for 10 min. and the solids ware filtered off, washed with water and dried to give 16.0 g (40.2 mM, 83.0%) of 5-[(4-aminobenzoyl)oxy]-1-naphthyl 4-aminobenzoate as beige crystals.

3) 5-{[4-((E)-{4-[(4-hydroxybenzyl)amino]-1-naphthyl}diazenyl)benzoyl]oxy}-1-naphtyl 4-((E)-{4-[(4-hydroxybenzyl)amino]-1-naphthyl}diazenyl)-benzoate 3) 5-[(4-{(E)-[4-({4-[(4-{[6-(methacryloyloxy)hexyl]oxy}benzoyl)oxy]benzyl}amino)-1-naphthyl]diazenyl}benzoyl)oxy]-1-naphthyl 4-{(E)-[4-({4-[(4-{[6-(methacryloyloxy)hexyl]oxy}benzoyl)oxy]benzyl}amino)-1-naphthyl]diazenyl}-benzoate

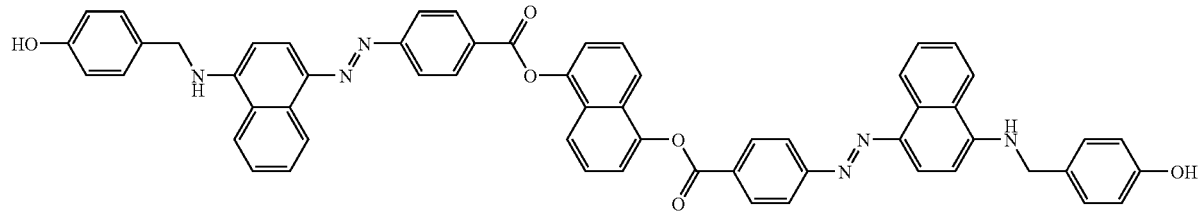

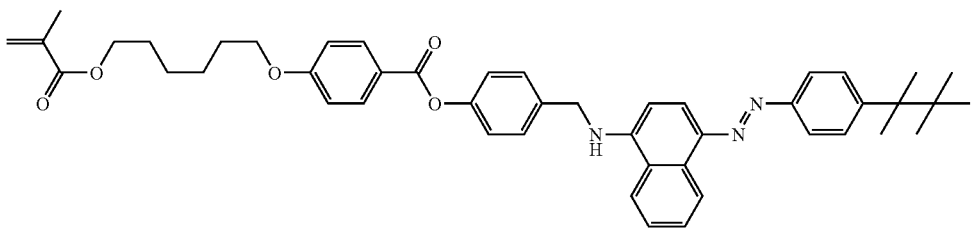

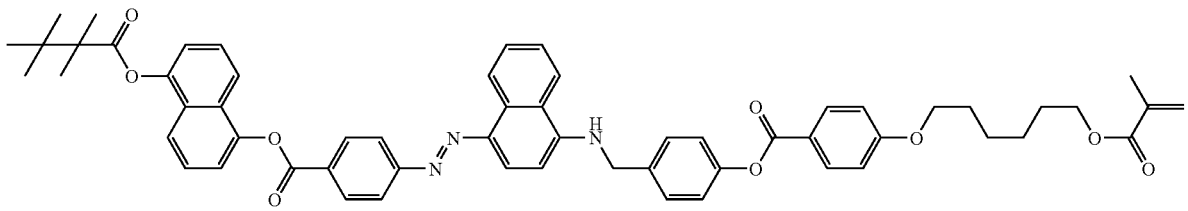

1.99 g of 5-[(4-aminobenzoyl)oxy]-1-naphthyl 4-aminobenzoate (5.0 mM) were suspended in 50 ml of DMF and 3 ml of hydrochloric acid 37%. The suspension was cooled to 3-7° C. and a solution of 0.70 g of sodium nitrite (10.1 mM) in 5 ml of water was added dropwise. When the addition was complete, the mixture was stirred for 45 min. at 3° C. then the excess of nitrite was destroyed by addition of Ca. 30 mg of amidosulfonic acid and the mixture stirred for further 10 min. To this mixture were added 40 ml of ice water followed by a solution of 2.49 g of 4-[(1-naphthylamino)methyl]phenol (10.0 mM) in 10 ml of DMF (dropwise) at 5-10° C. When addition was complete, the coupling mixture was stirred for 2 h at 10-20° C., then 50 ml of water were added and stirring was continued for 10 min. The pH of this mixture was then adjusted to pH=7 by addition of ammonia solution 26%. The mixture was poured onto 100 ml of water and the red precipitate was filtered off, washed with water and dried to give 4.40 g (4.79 mM, 96%) of 5-{[4-((E)-{4-[(4-hydroxybenzyl)amino]-1-naphthyl}diazenyl)benzoyl]oxy}-1-naphthyl 4-((E)-{4-[(4-hydroxybenzyl)amino]-1-naphthyl}diazenyl)-benzoate as a red powder.

1.53 g of 4-{([6-(methacryloyloxy)hexyl]oxy}benzoic acid (5.0 mM) were dissolved in 50 ml of THF and 5.06 g of triethylamine (50.0 mM). The solution was cooled to −30° C. and 0.57 g of methansulfochloride (5.0 mM) were added dropwise. The mixture was stirred for 1 h during which the temperature was allowed to rise to −10° C. At this temperature, 1.84 g of 5-{[4-((E)-{4-[(4-hydroxybenzyl)amino]-1-naphthyl}diazenyl)benzoyl]oxy}-1-naphthyl 4-((E)-{4-[(4-hydroxybenzyl)amino]-1-naphthyl}diazenyl)-benzoate (2.0 mM) were added at once, followed by 20 mg of DMAP. The reaction mixture was allowed to warm to room temperature while stirred overnight. The next day, the mixture was filtered through a pad of celite filter aid and evaporated to dryness. The residue was dissolved in 20 ml of dichloromethane and to this solution were added dropwise 20 ml of methanol at room temperature. When addition was complete, the resulting suspension was stirred for 10 min. and then the solids were filtered off, washed with methanol and dried to give 2.11 g (1.40 mM, 70%) of 5[(4-{(E)-[4-({4-[(4-{[6-methacryloyloxy)hexyl]oxy}benzoyl)oxy]benzyl}amino)-1-naphthyl]diazenyl}benzoyl)oxy]-1-naphthyl 4-{(E)-[4-({4-[(4-{[6-(methacryloyloxy)hexyl]oxy}benzoyl)oxy]benzyl}amino)-1-naphthyl]diazenyl}-benzoate as red crystals, $\lambda_{max}$=495 nm, $\epsilon$=66000 (THF).

EXAMPLE 3

Preparation of 6-[(4-{(E)-[4-({4-[(4-{[6-(vinyloxy)hexyl]oxy}benzoyl)oxy]benzyl}amino)-1-naphthyl]diazenyl}benzoyl)oxy]hexyl 4-{(E)-[4-({4-[(4-{[6-(vinyloxy)hexyl]oxy}benzoyl)oxy]benzyl}amino)-1-naphthyl]diazenyl}benzoate

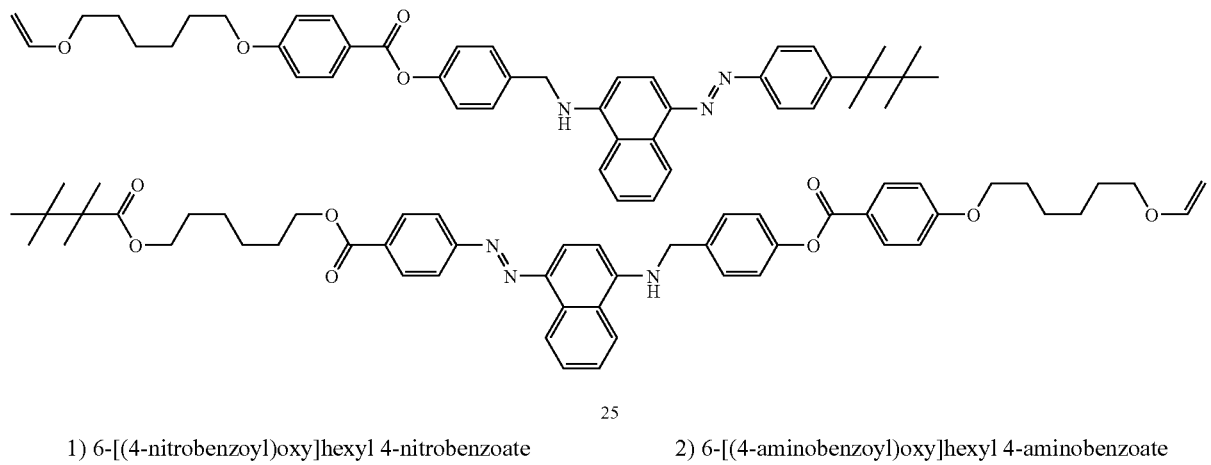

1) 6-[(4-nitrobenzoyl)oxy]hexyl 4-nitrobenzoate 2) 6-[(4-aminobenzoyl)oxy]hexyl 4-aminobenzoate

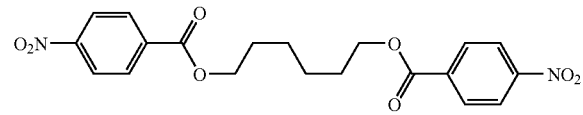

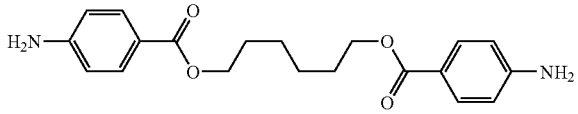

33.2 g of 4-nitrobenzoic acid (200.0 mM), 24.4 g of 1,6-dibromohexane (100.0 mM) and 41.5 g of potassium carbonate (300.0 mM) were suspended in 200 ml of DMF and this mixture was stirred at 120° C. for 2 h. It was then cooled to 60° C., poured onto 600 ml of water and the resulting suspension was stirred for 5 min. The precipitate was filtered off and the still wet cake was refluxed for 1 h in 300 ml of ethanol. It was then cooled to room temperature and filtered. The cake was washed with ethanol and dried to give 40.3 g (96.8 mM, 97%) of 6-[(4-nitrobenzoyl)oxy]hexyl 4-nitrobenzoate as a pale yellow powder.

40.1 g 6-[(4-nitrobenzoyl)oxy]hexyl 4-nitrobenzoate (96.3 mM) were suspended in 300 ml of ethyl acetate and 300 ml of THF and 4.0 g of palladium on charcoal (10%) were added. The resulting mixture was hydrogenated at atmospheric pressure until the theoretical amount of hydrogen was consumed. The mixture was then filtered, the cake was washed with DMF and the filtrate was evaporated. The residue was suspended in 200 of cyclohexane. It was stirred for 30 min. and then the solids were filtered off, washed with cyclohexane and dried to give 33.2 g (93.1 mM, 97%) of 6-[(4-aminobenzoyl)oxy]hexyl 4-aminobenzoate as beige crystals.

3) 6-{[4-((E)-{4-[(4hydroxybenzyl)amino]-1-naphthyl}diazenyl)benzoyl]oxy}hexyl 4-((E)-{4-[(4-hydroxybenzyl)amino]-1-naphthyl}diazenyl)-benzoate

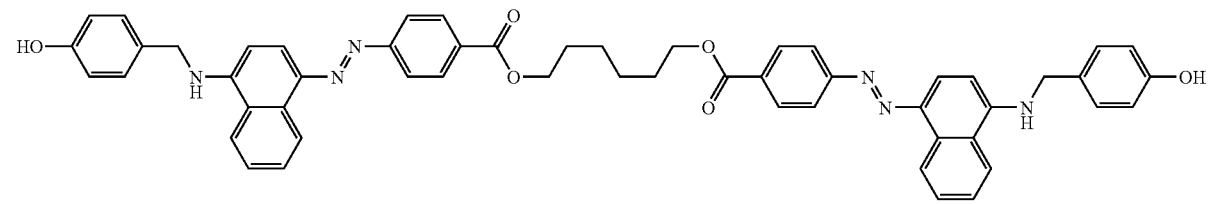

1.78 g of 6-[(4-aminobenzoyl)oxy]hexyl 4-aminobenzoate (5.0 mM) were suspended in 25 ml of DMF and 3 ml of hydrochloric acid 37%. The suspension was cooled to 3-7° C. and a solution of 0.70 g of sodium nitrite (10.1 mM) in 5 ml of water was added dropwise. When the addition was complete, the mixture was stirred for 45 min. at 3° C., then the excess of nitrite was destroyed by addition of ca. 30 mg of amidosulfonic acid and the mixture stirred for further 10 min. To this mixture were added 40 ml of ice water followed by a solution of 2.49 g of 4-[(1-naphthylamino)methyl]phenol (10.0 mM) in 10 ml of DMF (dropwise) at 5-10° C. When addition was complete, the coupling mixture was stirred for 2 h at 10-20° C., then 50 ml of water were added and stirring was continued for 10 min. The pH of this mixture was then adjusted to pH=7 by addition of ammonia solution 26%. The mixture was poured onto 100 ml of water and the red precipitate was filtered off, washed with water and dried to give 4.40 g (5.0 mM, 100%) of 6-{[4-((E)-{4-[(4-hydroxybenzyl)amino]-1-naphthyl}diazenyl)benzoyl]oxy}hexyl 4-((E)-{4-[(4-hydroxybenzyl)amino]-1-naphthyl}diazenyl)-benzoate as a red powder.

4) 6-[(4-{(E)-[4-({4-[(4-{[6-(vinyloxy)hexyl]oxy}benzoyl)oxy]benzyl}amino)-1-naphthyl]diazenyl}benzoyl)oxy]hexyl 4-{(E)-[4-({4-[(4-{[6-(vinyloxy)hexyl]oxy}benzoyl)oxy]benzyl}amino)-1-naphthyl]diazenyl}benzoate 0.66 g of 4-{[6-(vinyloxy)hexyl]oxy}benzoic acid (2.5 mM) were dissolved in 25 ml of THF and 2.53 g of triethylamine (25.0 mM). The solution was cooled to −30° C. and 0.29 g of methansulfochloride (2.5 mM) were added dropwise. The mixture was stirred for 1 h during which the temperature was allowed to rise to −10° C. At this temperature, 0.88 g of 6-{[4-((E)-{4-[(4-hydroxybenzyl)amino]-1-naphthyl}diazenyl)benzoyl]oxy}hexyl 4-((E)-{4-[(4-hydroxybenzyl)amino]-1-naphthyl}diazenyl)-benzoate (1.0 mM) were added at once, followed by 10 mg of DMAP. The reaction mixture was allowed to warm to room temperature while stirred overnight. The next day, the mixture was filtered through a pad of celite filter aid and evaporated to dryness. The residue was dissolved in 15 ml of THF and to this solution were added dropwise 25 ml of methanol at room temperature. When addition was complete, the resulting suspension was stirred for 30 min. at room temperature and then the solids were filtered off, washed with methanol and dried to give 0.75 g (0.55 mM, 55%) of 6-[(4-{(E)-[4-({4-[(4-{[6-(vinyloxy)hexyl]oxy}benzoyl)oxy]benzyl}amino)-1-naphthyl]diazenyl}benzoyl)oxy]hexyl 4-{(E)-[4-({4-[(4-{[6-(vinyloxy)hexyl]oxy}benzoyl)oxy]benzyl}amino)-1-naphthyl]diazenyl}benzoate as red crystals, $\lambda_{max}$=478 nm, $\epsilon$=62000 (THF).

EXAMPLE 4

Preparation of 4-[({4-[(E)-(4'-{(E)-[4-({4-[(4-{[6-(methacryloyloxy)hexyl]oxy}benzoyl)oxy]benzyl}amino)-1-naphthyl]diazenyl}3,3'-dimethyl-1,1'-biphenyl-4-yl)diazenyl]-1-naphthyl}amino)methyl]-phenyl 4-{[6-(methacryloyloxy)hexyl]oxy}benzoate

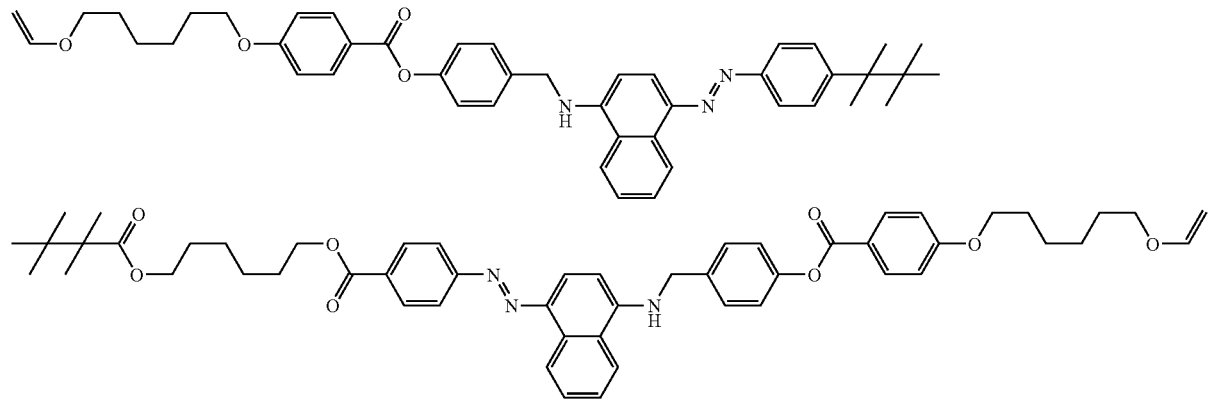

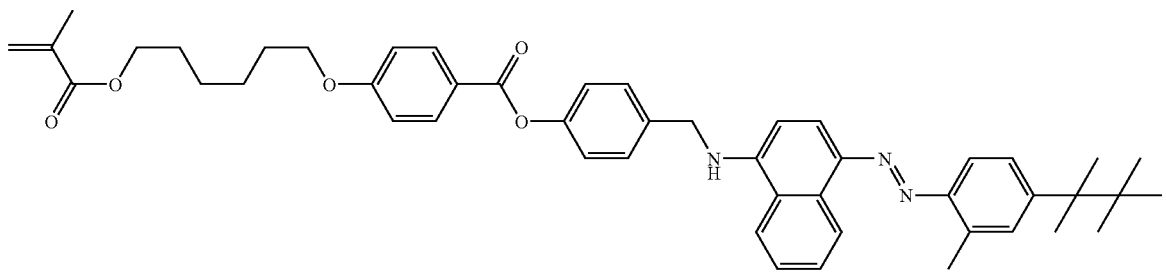

-continued

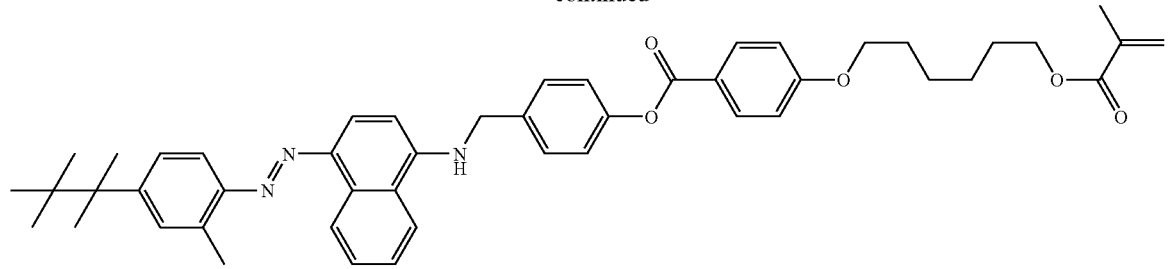

1) 4-{[(4-{(E)-[4'-((E)-{4-[(4-hydroxybenzyl)amino]-1-naphthyl}diazenyl)-3,3'-dimethyl-1,1'-biphenyl-4-yl]diazenyl}-1-naphthyl)amino]methyl}-phenol

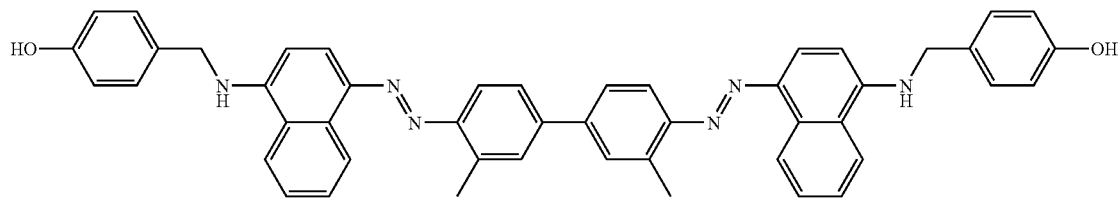

51.5 g of o-tolidine (200.0 mM) were suspended in 400 ml of water and stirred heavily until a fine suspension resulted. To this suspension were added 100 ml of hydrochloric acid 37%. The suspension was cooled to 5° C. and at this temperature was added a solution of 29.0 g sodium nitrite (420.0 mM) in 100 ml of water within 1 h. When the addition was complete, the mixture was stirred for 1.5 h at this temperature, then the excess of nitrite was destroyed by addition of approx. 2 g of urea and the mixture was stirred for further 10 min. This solution was added to a cooled solution of 99.7 g of 4-[(1-naphthylamino)methyl]phenol (400.0 mM) in 400 ml of DMF within 30 min. at 5-10° C. During addition of the tetrazonium-solution approx. 300 g of ice were added in order to maintain the temperature at 5-10° C. When addition of the tetrazonium-solution was complete, a solution of 39.25 g of potassium acetate (400.0 mM) in 40 ml of water was added dropwise and the coupling mixture was then stirred for 2 h at 5° C. Then, 1200 ml of a diluted ammonia-solution (80 ml of ammonia solution 26% and 1120 ml of water) were added dropwise at 5-10° C., which gave pH=8-9. The pH was then adjusted to 7 by addition of a small amount of glacial acetic acid. The resulting solids were filtered off and the wet cake was washed twice with each 150 ml of water. The still wet cake was treated with 1000 ml of methanol. This suspension was refluxed for 1 h, cooled to room temperature and filtered. The cake was washed with 200 ml of methanol and dried to give 164.2 g (224.0 mM; 112% (contains salts)) of 4-{[(4-{(E)-[4'-((E)-{4-[(4-hydroxybenzyl)amino]-1-naphthyl}diazenyl)-3,3'-dimethyl-1,1'-biphenyl-4-yl]diazenyl}-1-naphthyl)amino]methyl}-phenol as a red powder.

2) 4-[({4-[(E)-(4'-{(E)-[4-({4-[4-{[6-(methacryloyloxy)hexyl]oxy}benzoyl)oxy]benzyl}amino)-1-naphthyl]diazenyl}-3,3'-dimethyl-1,1'-biphenyl-4-yl)diazenyl]-1-naphthyl}amino)methyl]-phenyl 4-{[6-(methacryloyloxy)hexyl]oxy}benzoate

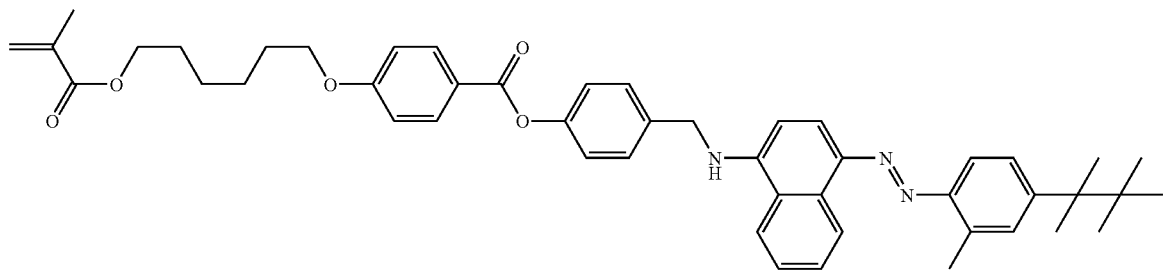

-continued

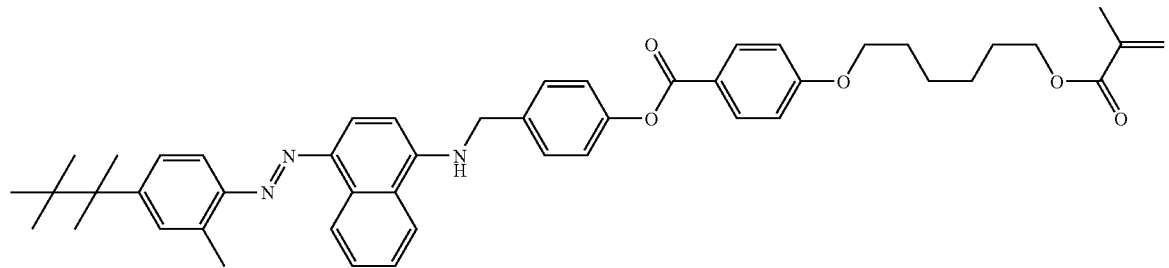

1.46 g of 4-{([6-(methacryloyloxy)hexyl]oxy}benzoic acid (4.75 mM) were dissolved in 30 ml of THF and 4.81 g of triethylamine (47.5 mM). The solution was cooled to –30° C. and 0.54 g of methansulfochloride (4.75 mM) were added dropwise. The mixture was stirred for 1 h during which the temperature was allowed to rise to –10° C. At this temperature, 1.39 g of 4-{[(4-{(E)-[4'-((E)-{4-[4-hydroxybenzyl)amino]-1-naphthyl}diazenyl)-3,3'-dimethyl-1,1'-biphenyl-4-yl]diazenyl}-1-naphthyl)amino]methyl}-phenol (1.90 mM) were added at once, followed by 20 mg of DMAP. The reaction mixture was allowed to warm to room temperature while stirred overnight. The next day, the mixture was filtered through a pad of celite filter aid and evaporated to dryness. The residue was suspended in 20 ml of acetone and 10 ml of THF and to this suspension were added dropwise 20 ml of methanol at 0-5° C. When addition was complete, the resulting suspension was stirred for 30 min. at 40° C. and then the solids were filtered off, washed with methanol and dried to give 1.98 g (1.51 mM, 80%) of 4-[({4-[(E)-(4'-{(E)-[4-({4-[(4-{[6-(methacryloyloxy)hexyl]oxy}benzoyl)oxy]benzyl}amino)-1-naphthyl]diazenyl}-3,3'-dimethyl-1,1'-biphenyl-4-yl)diazenyl]-1-naphthyl}amino)methyl]-phenyl 4-{[6-(methacryloyloxy)hexyl]oxy}benzoate as a red solid, $\lambda_{max}$=511 nm, $\epsilon$=70000 (THF).

EXAMPLES 5-13

The structural formulae and UV-data ($\lambda_{max}$- and $\epsilon$-values; in THF, if not otherwise indicated) of further dichroic dyes according to the invention, synthesized using similar methods as described in examples 1-4, will hereinafter be given.

EXAMPLE 5

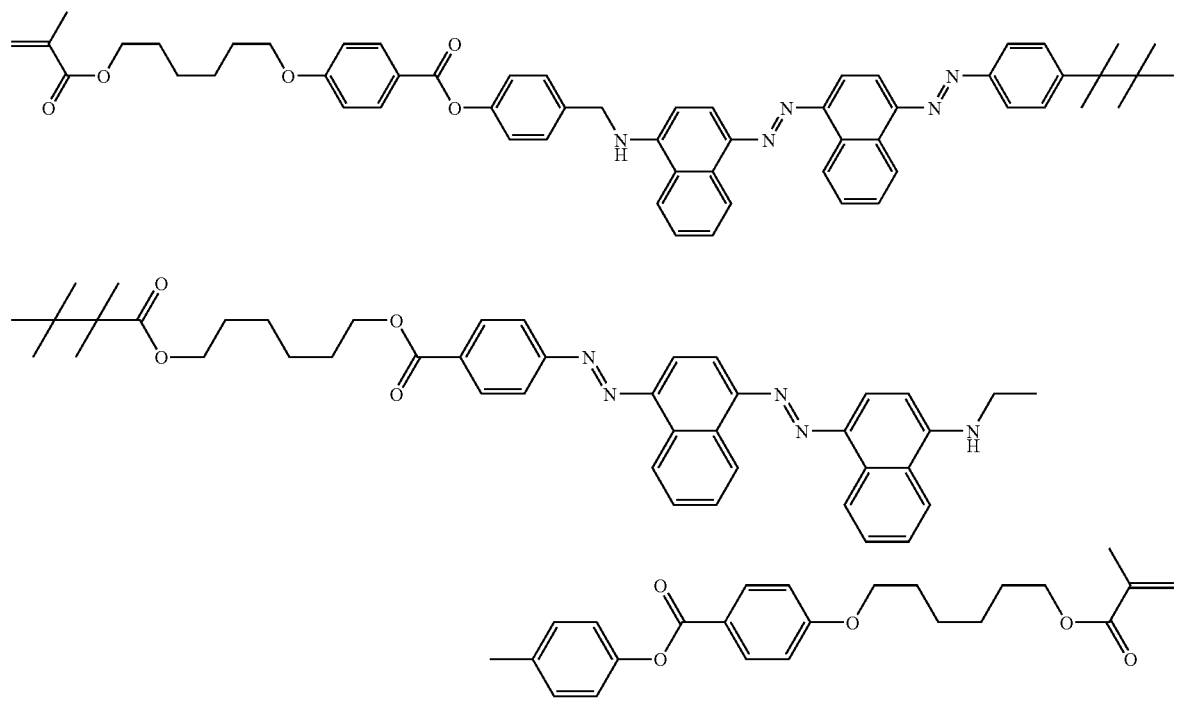

$\epsilon$ = 73000, $\lambda_{max}$ = 571 nm

EXAMPLE 6
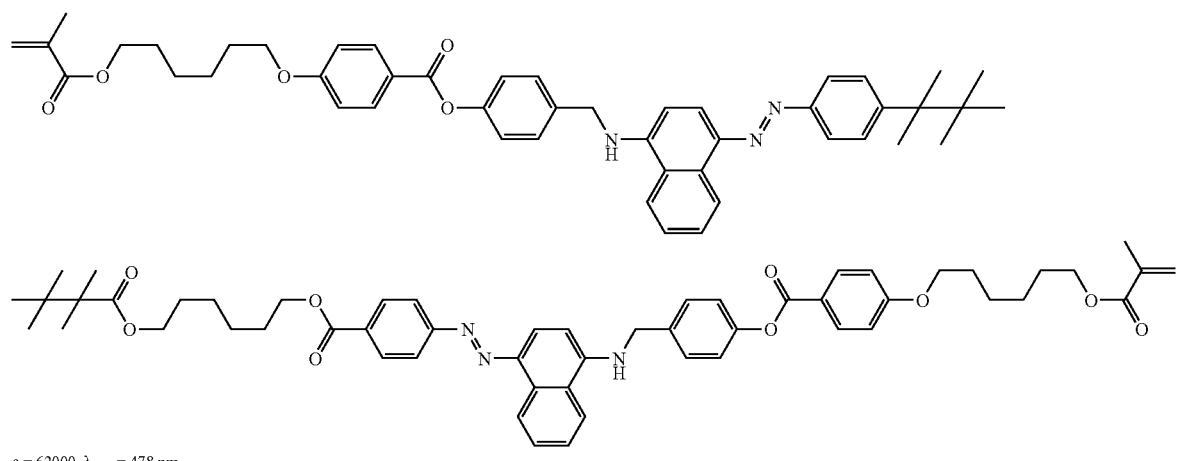
$\varepsilon = 62000, \lambda_{max} = 478$ nm
EXAMPLE 7
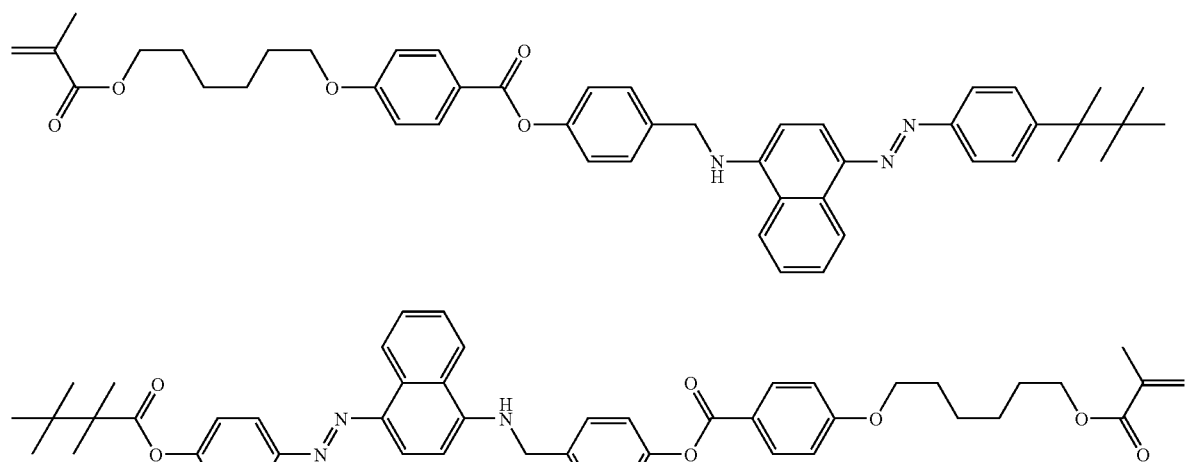
$\varepsilon = 60000, \lambda_{max} = 484$ nm
EXAMPLE 8
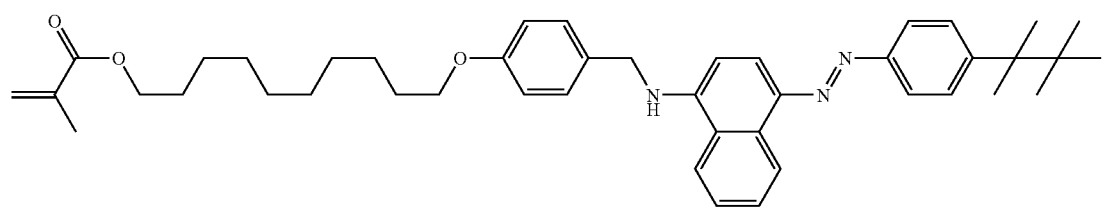

-continued
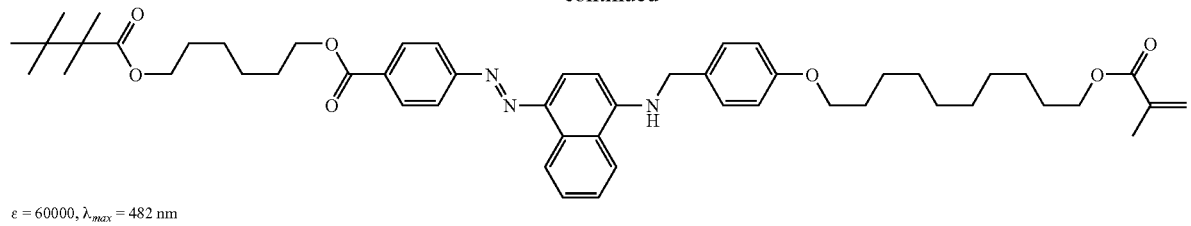
ε = 60000, λ_max = 482 nm
EXAMPLE 9
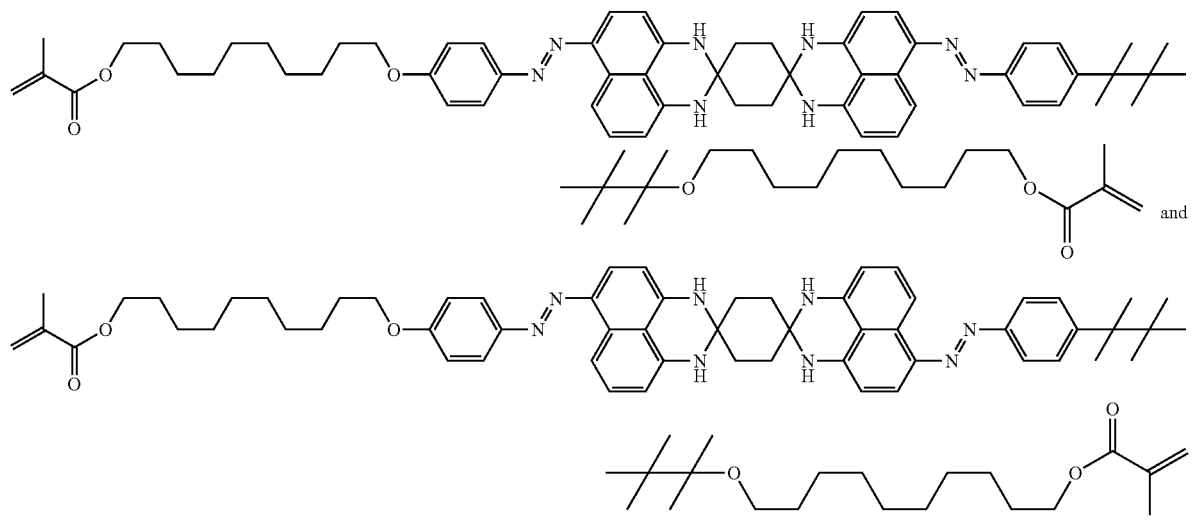
ε = 32100, λ_max = 493 nm
EXAMPLE 10
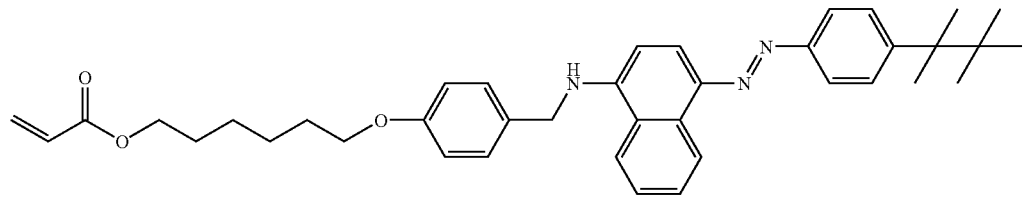
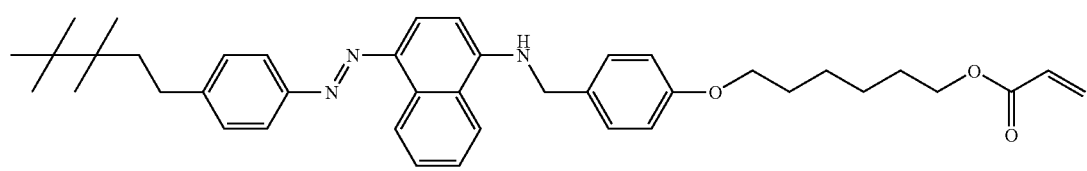
ε = 52000, λ_max = 449 nm EXAMPLE 11
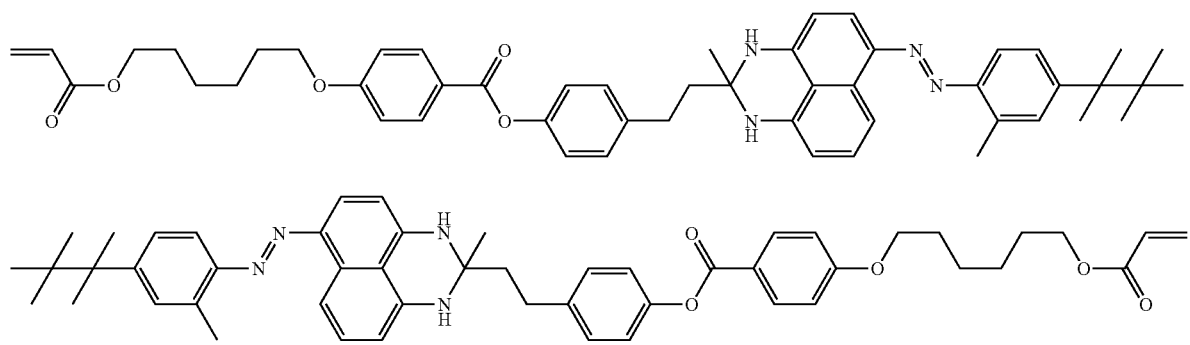
ε = 64300, λ$_{max}$ = 551 nm
EXAMPLE 12
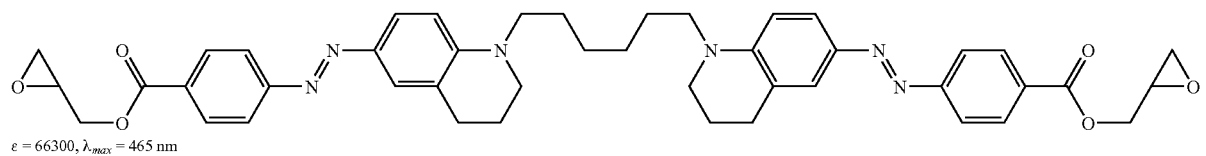
ε = 66300, λ$_{max}$ = 465 nm
EXAMPLE 13
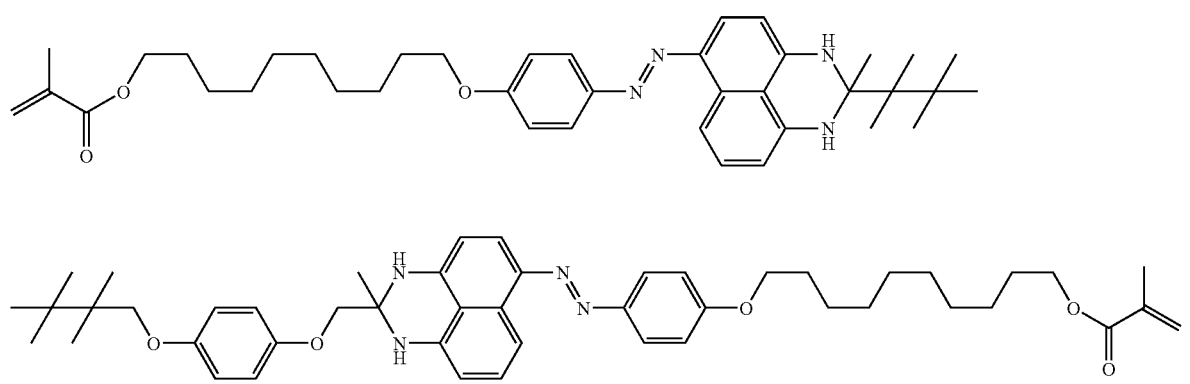
ε = 32800, λ$_{max}$ = 489 nm

EXAMPLE 14
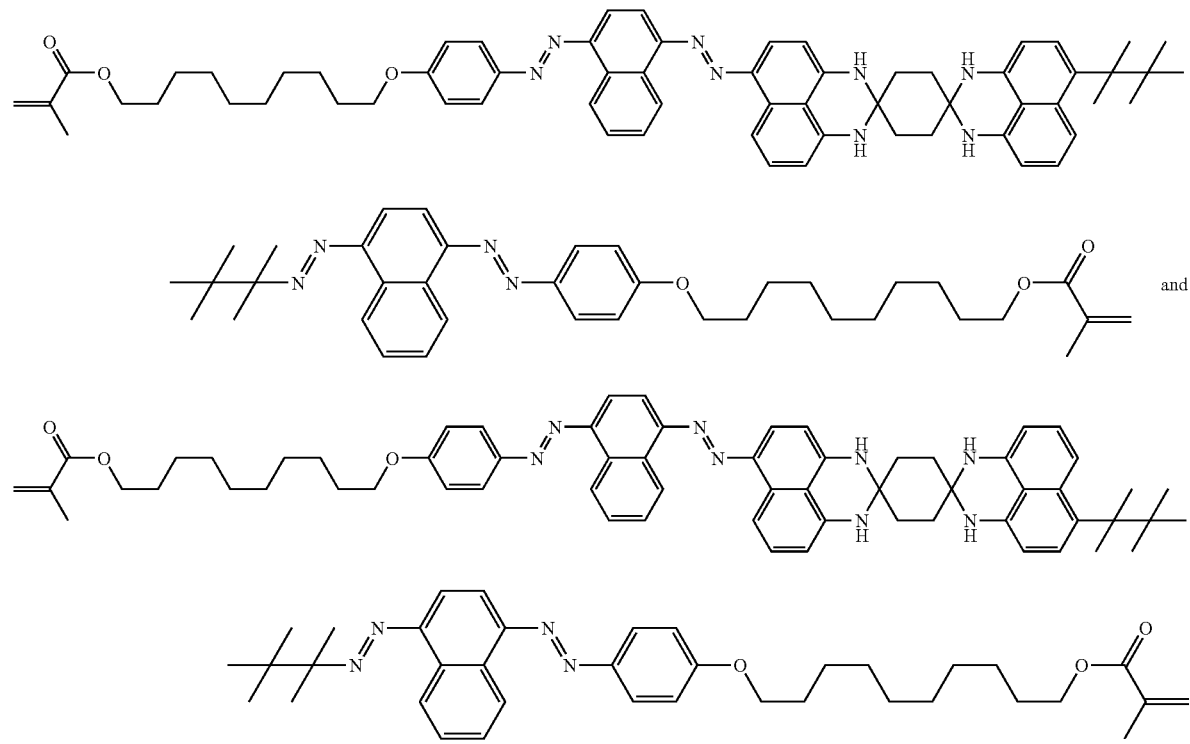
$\varepsilon = 78000, \lambda_{max} = 596$ nm
EXAMPLE 15
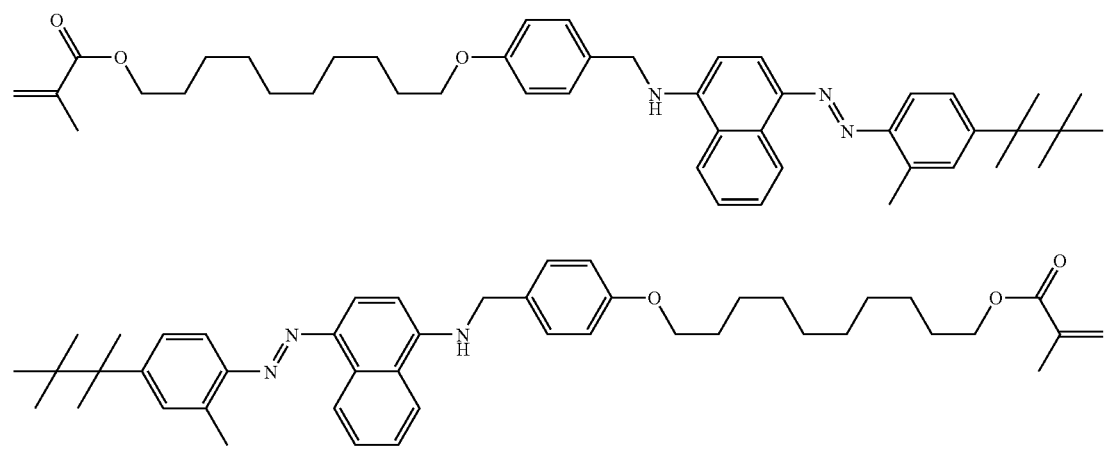
$\varepsilon = 69300, \lambda_{max} = 511$ nm

EXAMPLE 16
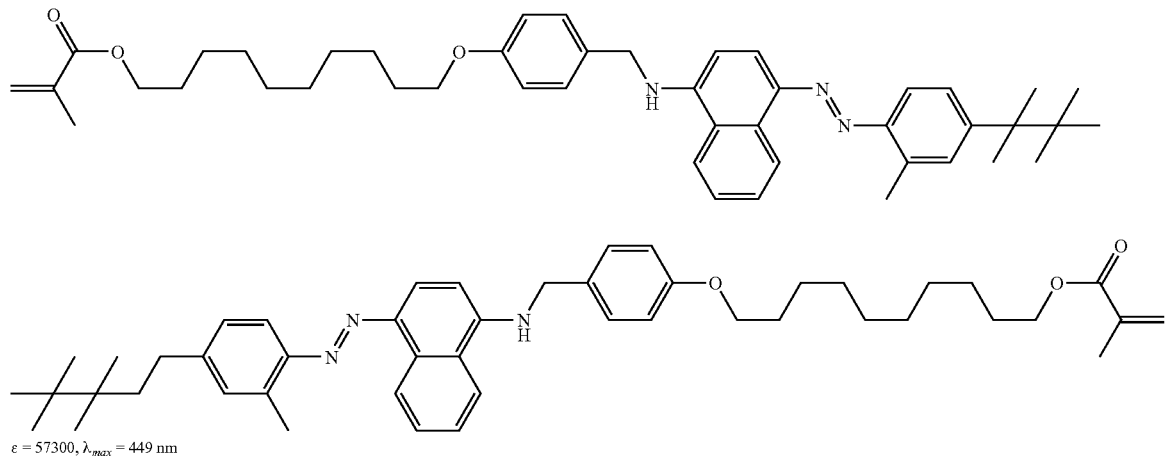
EXAMPLE 16a
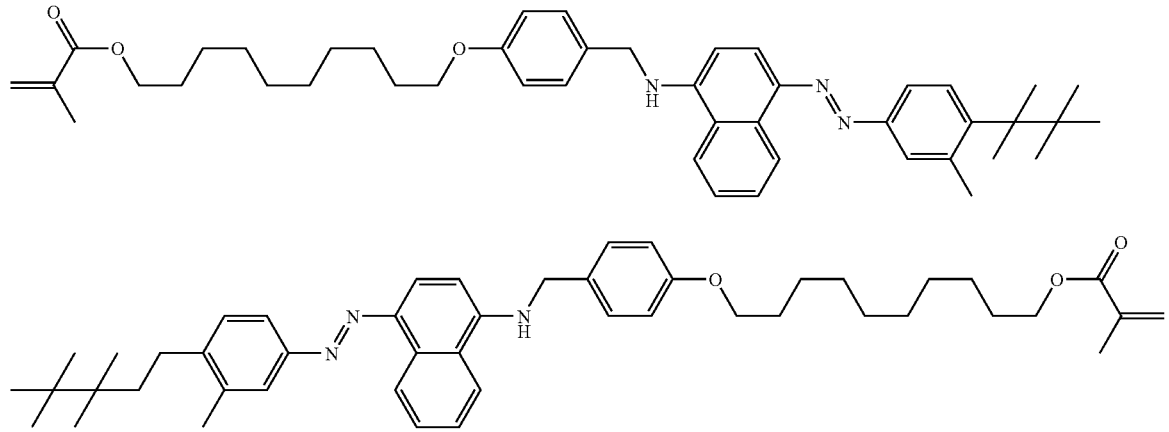
EXAMPLE 17
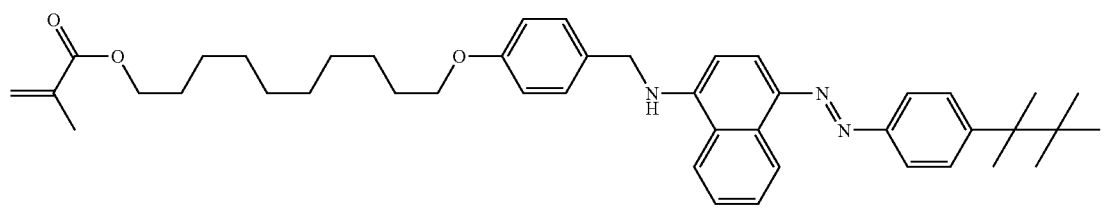

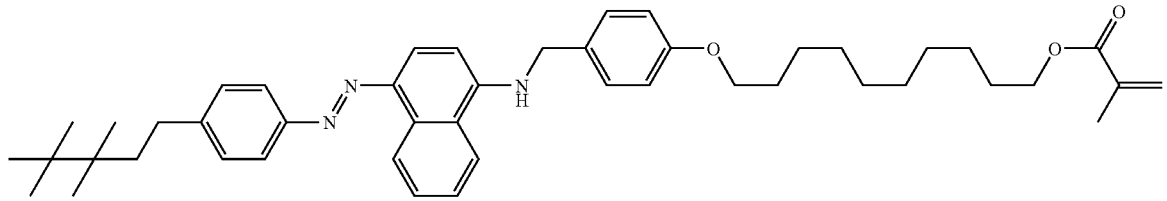

ε = 57000, λ$_{max}$ = 449 nm

EXAMPLES FOR THE PREPARATION OF DICHROIC MIXTURES

The order parameters shown hereinafter in the examples 18-22 are each obtained by dissolving a dichroic dye in a LCP mixture M$_{LCP}$. The mixture M$_{LCP}$ was composed of 99 weight % of the LCP monomer 10-[(4'-cyano-1,1'-biphenyl-4-yl)oxy]decyl 2,5-bis-[4-(6-acryloyloxyhexyloxy)benzoyloxy]benzoate (described in WO 00/551100, method of manufacture similar to Example 1) and 1 weight % of Tinuvin 123 (Ciba).

To this mixture M$_{LCP}$ were added 2 weight % of the photo initiator IRGARCURE369 (Ciba) and the below given amount of the respective dichroic dye to give the mixture M$_{LCP/DYE}$.

EXAMPLES FOR THE PREPARATION OF DICHROIC LCP FILMS

Samples of dichroic LCP films were prepared, whereby each sample comprised an alignment layer and a dichroic liquid crystalline polymer layer. The alignment layers were made using the linearly photo-polymerizable aligning (LPP) technique. The preparation of the samples is described in the following.

Suitable LPP materials for the production of an LPP orientation layer are, for example, described in patent publications EP 0 611 786, WO 96/10049 and EP 0 763 552, and include cinnamic acid derivatives and ferulic acid derivatives. For the examples, the following LPP material was chosen:

A 2% solution of this LPP material in methylpropylketone (MPK) as a solvent was spin-coated at 2000 rpm for 60 seconds at room temperature (20° C.). The layer was then dried for 5 to 10 minutes at 130 to 150° C. on a hot stage. Subsequently, the layer was exposed to linearly polarized light from a mercury high-pressure lamp for 10 to 550 seconds (depending on the strength of the lamp and on the characteristics of LPP and dichroic LCP layers) at room temperature. The layer was then used as an orientation layer for a liquid crystalline material comprising dichroic dyes.

For the production of the dichroic LCP layers, the mixtures M$_{LCP/DYE}$ were dissolved in anisole to give a 20 wt % solution. These LCP mixtures were then spin-coated at 800 rpm for 60 seconds on top of the photo-exposed LPP layers. The spin-coated dichroic LCP layers were then dried at 95° C. for approximately 5 minutes on a hot stage. For photo-initiated cross-linking of the liquid crystalline and dye components, the layers were exposed to isotropic light from a xenon lamp for about 5 minutes (depending on the strength of the lamp) in an inert atmosphere.

Using the procedure described above, five different examples, Examples 18-22, of photo-aligned dichroic LCP layers on glass substrates were prepared and their order parameter S measured at the indicated wavelength.

EXAMPLES OF ORDER PARAMETERS

EXAMPLE 18

For this example, 4 weight % of the dichroic dye of Example 5

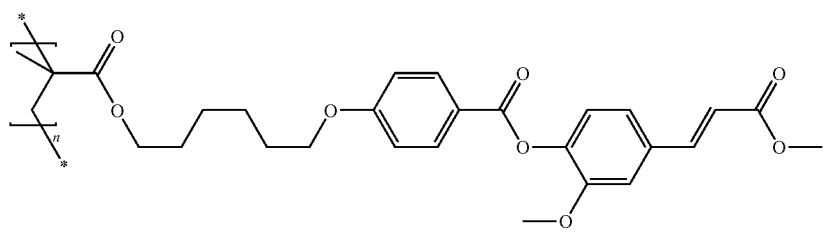

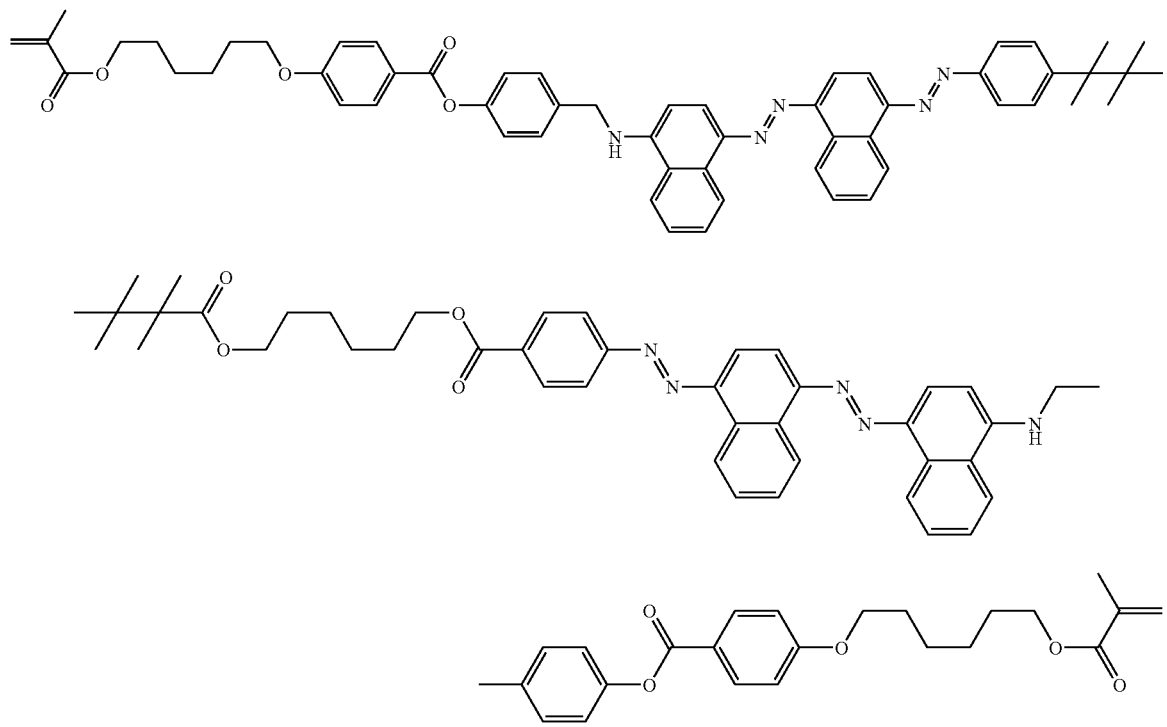
in the mixture $M_{LCP/DYE}$ was used.
The result for the order parameter S measured at the wavelength $\lambda_{max}$=597 nm was: S=0.84.
EXAMPLE 19
For this example, 4 weight % of the dichroic dye of Example 1
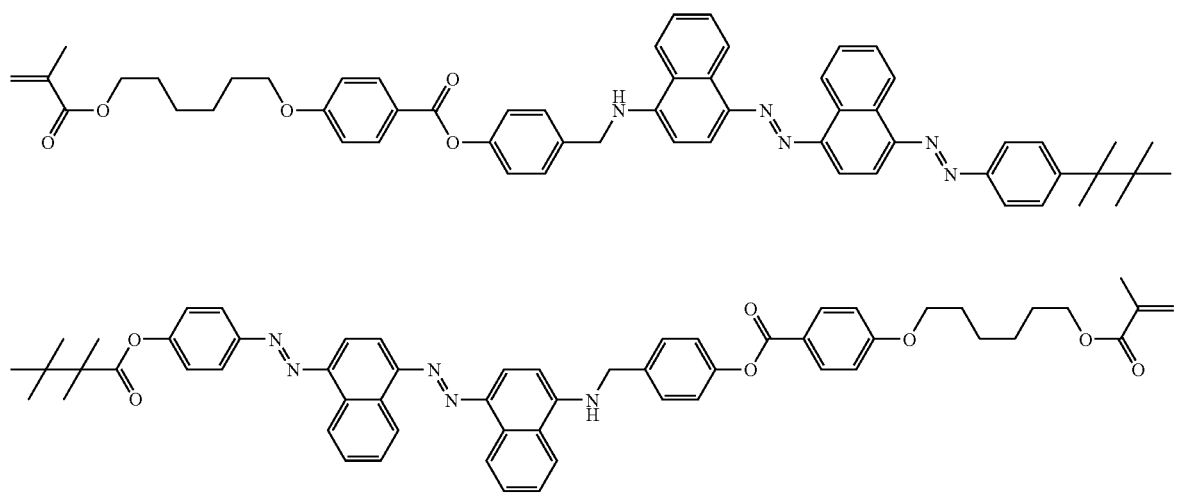
in the mixture $M_{LCP/DYE}$ was used.

The result for the order parameter S measured at the wavelength $\lambda_{max}$=595 nm was: S=0.86.

EXAMPLE 20

For this example, 4 weight % of the dichroic dye of Example 2

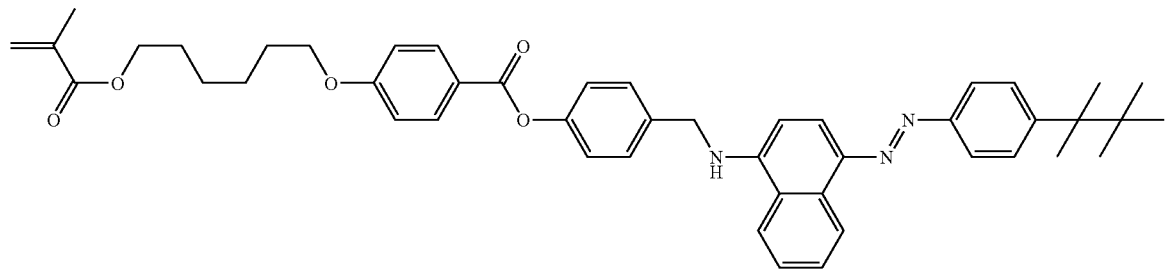

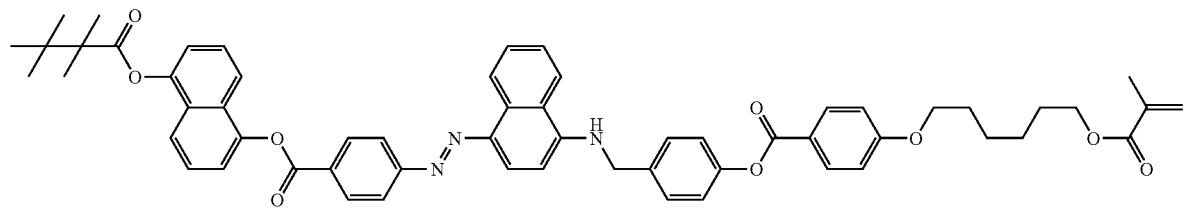

in the mixture $M_{LCP/DYE}$ was used.

The result for the order parameter S measured at the wavelength $\lambda_{max}$=514 nm was: S=0.85.

EXAMPLE 21

For this example, 4 weight % of the dichroic dye of Example 3

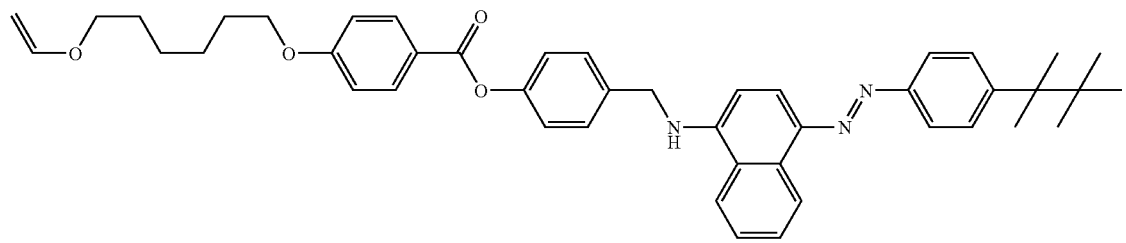

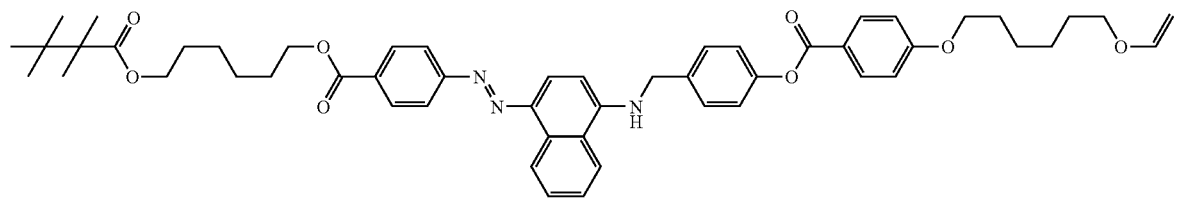

in the mixture $M_{LCP/DYE}$ was used.

The result for the order parameter S measured at the wavelength $\lambda_{max}$=502 nm was: S=0.81.

EXAMPLE 22

For this example, 4 weight % of the dichroic dye of Example 6

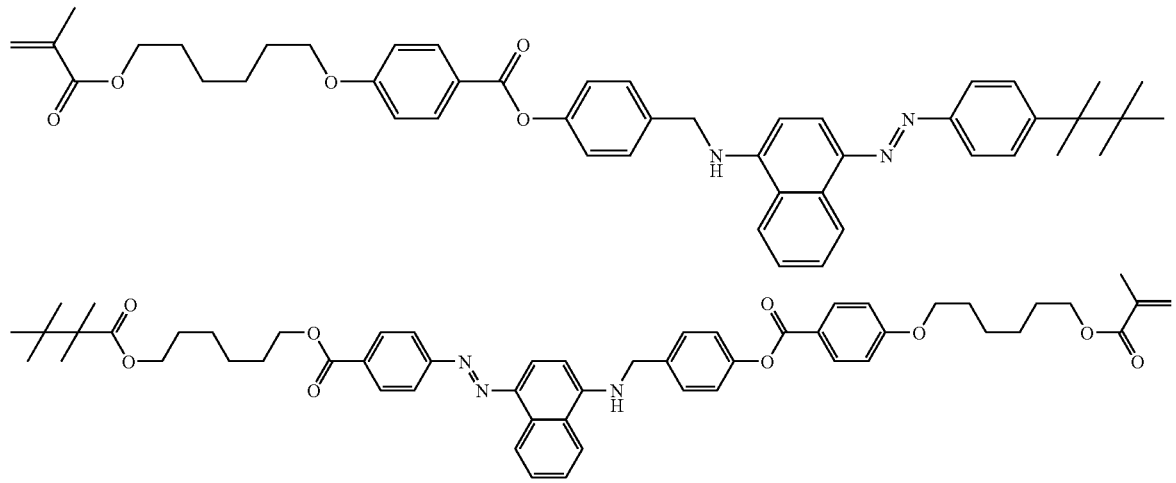

in the mixture $M_{LCP/DYE}$ was used.

The result for the order parameter S measured at the wavelength $\lambda_{max}$=501 nm was: S=0.82.

The invention claimed is:

1. A polymerizable dichroic azo dye of the general formula I

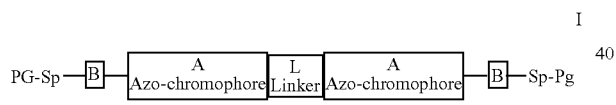

wherein:

A represents a dichroic residue, exhibiting at least partial absorption in the visible region between 400 nanometer and 800 nanometer and comprising at least one azo-binding group that is linked to at least one radical of formula a) to g) shown below, a)

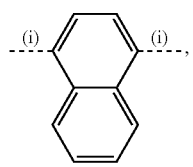

b)

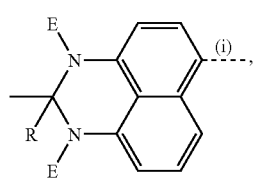

-continued c)

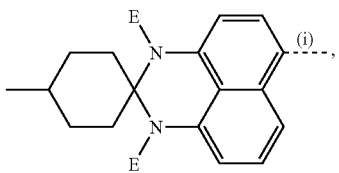

d)

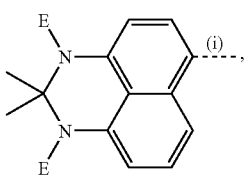

e)

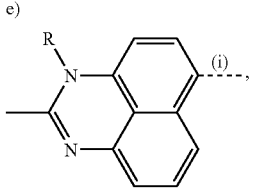

f)

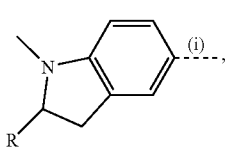

g)

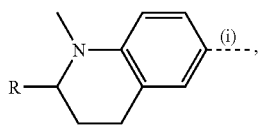

which radical of formula a) to g) may be unsubstituted, mono- or poly-substituted by fluorine, chlorine, hydroxy, —NR$^1$R$^2$ or by a straight chain or branched alkyl residue having 1-10 carbon atoms, which alkyl residue is unsubstituted, mono- or poly-substituted by fluorine, and wherein one or more of the non-adjacent CH$_2$ groups may independently be replaced by —O—, —CO—O—, —O—CO—, —NR$^1$—CO—, —CO—NR$^1$—, —NR$^1$—CO—O—, —O—CO—NR$^1$—, —CH=CH—, —O—CO—O—, wherein R$^1$ and R$^2$ independently represent hydrogen or lower alkyl, wherein the broken lines (i) symbolize the possible linkages to the azo-binding group and wherein:

R represents hydrogen or lower alkyl;

E each independently represents hydrogen, lower alkyl, lower acyl or a polymerizable group selected from acryloyl or methacryloyl;

B represents a group of substructure II

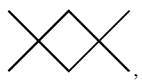

II wherein the broken line (ii) symbolizes the linkage to the azo-chromophore A and wherein D$^1$, D$^2$ each independently represents an aromatic or alicyclic group, which is unsubstituted or substituted by fluorine, chlorine, cyano, nitro, or by a straight chain or branched alkyl residue having 1-10 carbon atoms, which alkyl residue is unsubstituted, mono- or poly-substituted by fluorine and wherein one or more of the non-adjacent CH$_2$ groups may independently be replaced by Q, whereby Q represents —O—, —CO—, —CO—O—, —O—CO—, —Si(CH$_3$)$_2$—O—Si(CH$_3$)$_2$—, —NR—, —NR—CO—, —CO—NR—, —NR—CO—O—, —O—CO—NR—, —NR—CO—NR—, —CH=CH—, —C≡C—, —O—CO—O— and R has the meaning given above;

Z$^1$, Z$^2$ each independently represents a single covalent bond or a spacer unit, which is a straight-chain or branched alkylene residue, which is unsubstituted, mono-substituted by cyano or halogeno, or poly-substituted by halogeno, having 1 to 8 carbon atoms, wherein one or more of the non-adjacent CH$_2$ groups may independently be replaced by Q or —CR=C—CO—, wherein Q and R have the meaning given above;

m1, m2 independently are 0 or 1;

Sp represents a single covalent bond or a spacer unit, which is a straight-chain or branched alkylene residue, which is unsubstituted, mono-substituted by cyano or halogeno, or poly-substituted by halogeno, having 1 to 24 carbon atoms, wherein one or more of the non-adjacent CH$_2$ groups may independently be replaced by Q, wherein Q has the meaning given above;

L represents a group of substructure III

—X$^1$—(W)$_n$—X$^2$—  III wherein:

X$^1$, X$^2$ each independently represents a single covalent bond or a spacer unit, which is a straight-chain or branched alkylene residue, which is unsubstituted, mono-substituted by cyano or halogeno, or poly-substituted by halogeno, having 1 to 8 carbon atoms, wherein one or more of the non-adjacent CH$_2$ groups may independently be replaced by —O—, —CO—, —CO—O—, —O—CO—, —Si(CH$_3$)$_2$—O—Si(CH$_3$)$_2$—, —NE—, —NR—CO—, —CO—NR—, —NR—CO—O—, —O—CO—NR—, —NR—CO—NR—, —CH=CH—, —N=CR—, —CR=N—, —C≡C—, —O—CO—O— or —CR=C—CO—, wherein R and E have the meaning given above;

W represents a spacer unit, which is a straight-chain or branched alkylene residue, which is unsubstituted, mono-substituted by cyano or halogeno, or poly-substituted by halogeno, having 1 to 24 carbon atoms, wherein one or more of the non-adjacent CH$_2$ groups may independently be replaced by Q, wherein Q has the meaning given above and wherein heteroatoms are not directly linked to each other, or an aromatic or alicyclic group, which is unsubstituted or substituted by fluorine, chlorine, cyano, nitro, or by a straight chain or branched alkyl residue having 1-10 carbon atoms, which alkyl residue is unsubstituted, mono- or polysubstituted by fluorine and wherein one or more of the non-adjacent CH$_2$ groups may independently be replaced by Q, wherein Q has the meaning given above, and n is 0 or 1 or, if two radicals of formula d) are attached to L, L represents a radical of formula h) to j) shown below, h)

i)

j)

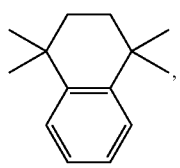

which radical of formula h) to j) may be unsubstituted, mono- or poly-substituted by fluorine, chlorine, hydroxy, —NR$^1$R$^2$ or by a straight chain or branched alkyl residue having 1-10 carbon atoms, which alkyl residue is unsubstituted, mono- or poly-substituted by fluorine, and wherein one or more of the non-adjacent CH$_2$ groups may independently be replaced by —O—, —CO—O—, —O—CO—, —NR¹—CO—, —CO—NR¹—, —NR¹—CO—O—, —O—CO—NR¹—, —CH═CH—, —C≡C—, —O—CO—O—, wherein R¹ and R² independently represent hydrogen or lower alkyl;

PG represents CH$_2$═CY—COO—, CH$_2$═CH—O—, CH$_2$═CH—OOC—,

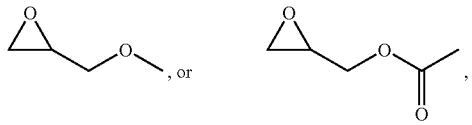

wherein Y is hydrogen or methyl.

2. A polymerizable dichroic azo dye according to claim 1, wherein A comprises at least one azo-binding group that is linked to at least one radical of formula a), b), c), d) or g) which radical of formula a) to d) or g) may be unsubstituted, mono- or poly-substituted by chlorine, or by a —CH$_3$ and wherein in the radical of formula b) or g) R represents hydrogen, methyl, ethyl, propyl or isopropyl and in the radicals b)–d) E each independently represents hydrogen, methyl or acetyl.

3. A polymerizable dichroic azo dye according to claim 2, wherein A is a dichroic residue of general formula IV:

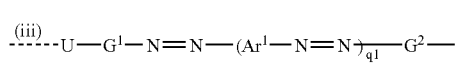

wherein the broken line (iii) symbolizes the linkage to the group B and
wherein
$G^1$ and $G^2$ independently of each other represent 1,4-phenylene, which is unsubstituted, mono- or disubstituted by chlorine or —CH$_3$ or a group of formula a), b), c) or d), with the proviso that $G^1$ does not represent a group of formula d);
$Ar^1$ is 1,4-phenylene, which is unsubstituted, mono- or disubstituted by chlorine or —CH$_3$, or unsubstituted 1,4-naphthylene, with the proviso that $Ar^1$ is unsubstituted 1,4-naphthylene if $G^1$ and $G^2$ are optionally substituted 1,4-phenylene;
$q^1$ is 0 or 1
U when linked to 1,4-phenylene or 1,4-naphthylene represents a single covalent bond, —CO—O—, —O—CO—, —CH$_2$—O—, —O—CH$_2$—, —NR— or —CH$_2$—NR—, —NR—CH$_2$—, —NR—CO— or —CO—NR—, wherein E and R have the meaning given above, or wherein U when linked to a group of formula b) or c) represents a single covalent bond, —CH$_2$—CH$_2$— or —O—CH$_2$—$^{(iv)}$, wherein E and R have the meaning given above and the broken lines (iv) symbolize the linkage to the groups of formula b) or c).

4. A polymerizable dichroic azo dye according to claim 3, wherein
$D^1$ and $D^2$ independently of each other represent 1,4-phenylene, which is unsubstituted, mono- or poly-substituted by fluorine, chlorine, methyl, methoxy, acyl or —CO—O—CH$_3$;
$M^1$, $m^2$ are independently of each other 0 or 1;
$Z^1$ and $Z^2$ independently of each other represent a single covalent bond, —O—, —CO—O—, —O—CO—, —CH$_2$—O— or —O—CH$_2$—.

5. A polymerizable dichroic azo dye according to claim 1, wherein
Sp represents a single bond, ethylene, propylene, butylene, pentylene, hexylene, heptylene, octylene, nonylene, decylene, undecylene, or dodecylene.

6. A polymerizable dichroic azo dye according to claim 5, wherein
L when linked to two groups of formula d) represents a radical of formula i), which is unsubstituted, mono- or poly-substituted by methyl or represents a group of substructure III, wherein
$X^1$ and $X^2$ when linked to 1,4-phenylene or 1,4-naphthylene each independently of each other represent a single covalent bond, —CO—O—, —O—CO—, —CH$_2$—O—, —O—CH$_2$—, —NR— or —CH$_2$—NR—, —NR—CH$_2$—, —NR—CO— or —CO—NR—, wherein E and R have the meaning given above, or
when linked to a group of formula b) or c) each independently of each other represent a single covalent bond, —CH$_2$—CH$_2$— or —O—CH$_2$—$^{(iv)}$, wherein E and R have the meaning given above and the broken lines (iv) symbolize the linkage to the groups of formula b) or c);
W represents ethylene, propylene, butylene, pentylene, hexylene, heptylene, octylene, nonylene, decylene, undecylene, or dodecylene; or 1,4-phenylene, 1,4-naphthylene, 1,5-naphthylene or 2,6-naphthylene, which are unsubstituted, mono-or poly-substituted by fluorine, chlorine, methyl, methoxy, acyl or —CO—O—CH$_3$;
n is 0 or 1.

7. A polymerizable dichroic azo dye according to claim 6, wherein at least one of $G^1$ and $G^2$ represent 1,4-phenylene, which is unsubstituted, mono- or disubstituted by chlorine or —CH$_3$.

8. A polymerizable dichroic azo dye according to claim 7, wherein $G^2$ represents 1,4-phenylene, which is unsubstituted, mono- or disubstituted by chlorine or —CH$_3$.

9. A polymerizable dichroic azo dye according to claim 8, wherein $G^1$ is unsubstituted 1,4-naphthylene.

10. A polymerizable dichroic azo dye according to claim 1, wherein the dichroic residue A is represented by formula IV:

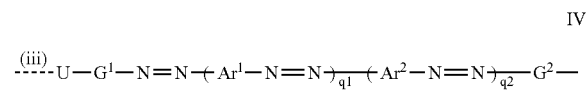

wherein the broken line (iii) symbolizes the linkage to the group B and wherein
$Ar^1$, $Ar^2$ independently of each other are 1,4-phenylene, 1,4- or 1,5-naphthylene, which are unsubstituted, mono- or poly-substituted by fluorine, chlorine, hydroxy, —NR¹R² or by a straight chain or branched alkyl residue having 1-10 carbon atoms, which alkyl residue is unsubstituted, mono- or poly substituted by fluorine, and wherein one or more of the non-adjacent CH$_2$ groups may independently be replaced by Q, wherein Q has the meaning given above and R¹ and R² independently represent hydrogen or lower alkyl;
$q^1$, $q^2$ independently are 0 or 1;
$G^1$, $G^2$ represent independently of each other 1,4-phenylene, 2,4-thiazolene, 2,5thiazolene or a group of formula al) to g)

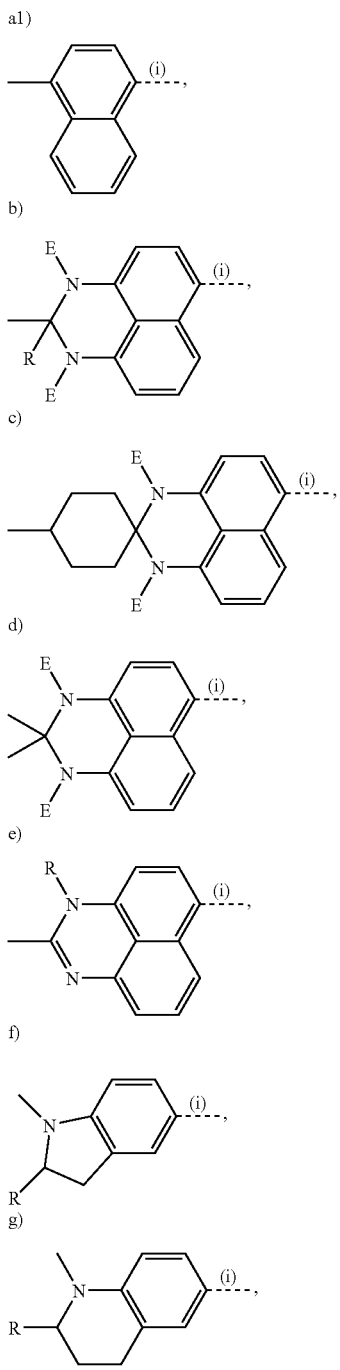

which 1,4-phenylene, 2,4-thiazolene, 2,5-thiazolene and group of formula a1) to g) are unsubstituted, mono- or poly-substituted by fluorine, chlorine, hydroxy, —$NR^1R^2$ or by a straight chain or branched alkyl residue having 1-10 carbon atoms, which alkyl residue is unsubstituted, mono- or poly-substituted by fluorine, and wherein one or more of the non-adjacent $CH_2$ groups may independently be replaced by —O—, —CO—O—, —O—CO—, —$NR^1$—CO—, —CO—$NR^1$—, —$NR^1$—CO—O—, —O—CO—$NR^1$—, —CH═CH—, —C≡C—, —O—CO—O—, wherein $R^1$ and $R^2$ independently represent hydrogen or lower alkyl, with the proviso that $G^1$ is not a group of formula d) and wherein the broken lines (i) symbolize the linkage to the azo-binding group and R, E have the meaning given above;

U represents a single covalent bond or a spacer unit, which is a straight-chain or branched alkylene residue, which is unsubstituted, mono-substituted by cyano or halogeno, or poly-substituted by halogeno, having 1 to 8 carbon atoms, wherein one or more of the non-adjacent $CH_2$ groups may independently be replaced by —O—, —CO—, —CO—O—, —O—CO—, —Si(CH$_3$)$_2$—O—Si(CH$_3$)$_2$—, —NE—, —NR—CO—, —CO—NR—, —NR—CO—O—, —O—CO—NR—, —NR—CO—NR—, —N═CR—, —CR═N—, —CH═CH—, —C≡C—, —O—CO—O— or —CR═C—CO——and R and E have the meaning given above;

with the proviso that if $G^1$ and $G^2$ are optionally substituted 1,4-phenylene, 2,4-thiazolene or 2,5-thiazolene at least one of $Ar^j$ or $Ar^e$ is optionally substituted 1,4-naphthylene.

11. A polymerizable dichroic azo dye according to claim 1 or 10, wherein PG is independently selected from $CH_2$═CY—COO—, and wherein Y is hydrogen or methyl.

12. A polymerizable dichroic azo dye according to claim 1, wherein rings $D^1$ and $D^2$ independently of each other are unsubstituted, saturated five- or six-membered alicyclic rings or six- or ten-membered aromatic rings, which are unsubstituted, mono- or poly-substituted by fluorine, chlorine or nitro or by a straight chain or branched alkyl residue having 1-6 carbon atoms, which alkyl residue is unsubstituted, mono- or poly-substituted by fluorine, and wherein one or more of the non-adjacent $CH_2$ groups may independently be replaced by —O—, —CO—O—, —O—CO—, —$NR^2$—CO—, —CO—$NR^2$—, —$NR^2$—CO—O—, —O—CO—$NR^2$—, —CH═CH—, —C≡C—, —O—CO—O—, wherein $R^2$ represents hydrogen or lower alkyl.

13. A polymerizable dichroic azo dye according to claim 12, wherein rings $D^1$ and $D^2$ are unsubstituted cyclopentane-1,3-diyl, unsubstituted 1,3-dioxane-2,5-diyl, unsubstituted cyclohexane-1,4-diyl, unsubstituted naphthalene-2,6-diyl or 1,4-phenylene, which is unsubstituted, mono- or poly-substituted by fluorine or chlorine or by a straight-chain or branched alkyl residue having 1-3 carbon atoms, which alkyl residue is unsubstituted, mono- or poly-substituted by fluorine, and wherein one or more of the non-adjacent $CH_2$ groups may independently be replaced by —O—, —CO—O—, —O—CO—, —CH═CH—, —C≡C—.

14. A polymerizable dichroic azo dye according to claim 12, wherein rings $D^1$ and $D^2$ are 1,4-phenylene, which is unsubstituted, mono- or poly-substituted by fluorine, chlorine, methyl, methoxy, acyl or —CO—O—$CH_3$.

15. A polymerizable dichroic azo dye according to claim 1, wherein Sp is a single bond, or a straight-chain or branched alkylene grouping, which is —(CH$_2$)$_r$—, and also —(CH$_2$)$_r$—O—(CH$_2$)$_s$—, —(CH$_2$)$_r$—CO—O—(CH$_2$)$_s$—, —(CH$_2$)$_r$—O—CO—(CH$_2$)$_s$—, —(CH$_2$)$_r$—$NR^2$—CO—(CH$_2$)$_s$—, —(CH$_2$)$_r$—$NR^2$—CO—O—(CH$_2$)$_s$—, —(CH$_2$CH$_2$)$_u$—(OCH$_2$CH$_2$)$_v$—, wherein r and s are each an integer from 1 to 22 and the sum of r +s ≦23, and wherein u is an integer from 1 to 10, v is an integer from 1 to 7 and the sum of u +v ≦8, wherein $R^2$ represents hydrogen or lower alkyl, and which are attached to group B and the polymerizable group, respectively, such that heteroatoms are not directly linked to each other.

16. A polymerizable dichroic azo dye according to claim 15, wherein Sp is a single bond or a $C_{1-14}$ straight-chain alkylene group, especially ethylene, propylene, butylene, pentylene, hexylene, heptylene, octylene, nonylene, decylene, undecylene, or dodecylene.

17. A polymerizable dichroic azo dye according to claim 1, wherein $Z^1$ and $Z^2$ groups are each independently selected from a group consisting of a single covalent bond or a straight-chain or branched alkylene residue, which is unsubstituted, mono-substituted or poly-substituted by fluoro, having 1 to 8 carbon atoms, wherein one or more of the non-adjacent $CH_2$ groups may independently be replaced by —O—,
—CO—, —CO—O—, —O—CO—, —NR$^2$—CO—, —CO—NR$^2$—, —NR$^2$—CO—O—, —O—CO—NR$^2$—, —CH=CH—, —C≡C—, —O—CO—O—, —CR$^2$=C—CO—, wherein R$^2$ represents hydrogen or lower alkyl.

18. A polymerizable dichroic azo dye according to claim 17, wherein $Z^1$ and $Z^2$ are each independently selected from a group consisting of a single covalent bond or a straight-chain or branched alkylene residue, having 1 to 4 carbon atoms, wherein one or more of the non-adjacent $CH_2$ groups may independently be replaced by —O—, —CO—O—, —O—CO—, —CH=CH—, —C≡C—, —O—CO—O—, —CR$^2$=C—CO—, wherein R$^2$ represents hydrogen or lower alkyl.

19. A polymerizable dichroic azo dye according to claim 17, wherein $Z^1$ and $Z^2$ are each independently selected from a group consisting of a single covalent bond, —O—, —CO—O—, —O—CO—, —CH$_2$—O— or —O—CH$_2$—.

20. A polymerizable dichroic azo dye according to claim 1, wherein E represents hydrogen, methyl, acetyl, acryloyl and methacryloyl.

21. A polymerizable dichroic azo dye according to claim 20, wherein E represents hydrogen, methyl and acetyl.

22. A polymerizable dichroic azo dye according to claim 10, wherein the sum of the integers $q^1 + q^2$ is 0 or 1.

23. A polymerizable dichroic azo dye according to claim 1, wherein W is a straight-chain or branched alkylene grouping, which is —(CH$_2$)$_r$—, and also —(CH$_2$)$_r$—O—(CH$_2$)$_s$—, —(CH$_2$)$_r$—CO—O—(CH$_2$)$_s$—, —(CH$_2$)$_r$—O—CO—(CH$_2$)$_s$—, —(CH$_2$)$_r$—NR$^2$—CO—(CH$_2$)$_s$—, —(CH$_2$)$_r$—NR$^2$—CO—O—(CH$_2$)$_s$—, —(CH$_2$CH$_2$)$_u$—(OCH$_2$CH$_2$)$_v$—, wherein r and s are each an integer from 1 to 22 and the sum of r +s ≦23, and wherein u is an integer from 1 to 10, v is an integer from 1 to 7 and the sum of u +v ≦8, and wherein R$^2$ represents hydrogen or lower alkyl, or an unsubstituted, saturated five- or six-membered alicyclic ring or six- or ten-membered aromatic ring, which is unsubstituted, mono- or poly-substituted by fluorine, chlorine or nitro or by a straight chain or branched alkyl residue having 1-6 carbon atoms, which alkyl residue is unsubstituted, mono- or poly-substituted by fluorine, and wherein one or more of the non-adjacent CH$_2$ groups may independently be replaced by —O—, —CO—O—, —O—CO—, —NR$^2$—CO—, —CO—NR$^2$—, —NR$^2$—CO—O—, —O—CO—NR$^2$—, —CH=CH—, —C≡C—, —O—CO—O—, wherein R$^2$ represents hydrogen or lower alkyl.

24. A polymerizable dichroic azo dye according to claim 23, wherein W is a $C_{1-14}$ straight-chain alkylene group, especially ethylene, propylene, butylene, pentylene, hexylene, heptylene, octylene, nonylene, decylene, undecylene, or dodecylene; or 1,4-phenylene, 1,4-naphthylene, 1,5-naphthylene or 2,6-naphthylene, which are unsubstituted, mono-or poly-substituted by fluorine, chlorine, methyl, methoxy, acyl or —CO—O—CH$_3$.

25. A polymerizable dichroic azo dye according to claim 1, wherein $X^1$, $X^2$ and U when linked to 1,4-phenylene or 1,4-naphthylene each independently represent a single covalent bond, —CO—O—, —O—CO—, —CH$_2$—O—, —O—CH$_2$—, —NE—, —CH$_2$—NE—, —NE—CH$_2$—, —N=CR—, —CR=N—, —NR—CO— or —CO—NR—, and more preferably a single covalent bond, —CO—O—, —O—CO—, —CH$_2$—O—, —O—CH$_2$—, —NR— or —CH$_2$—NR—, —NR—CH$_2$—, —NR—CO— or —CO—NR—, wherein E and R have the meaning given above.

26. A polymerizable dichroic azo dye according to claim 1, wherein $X^1$, $X^2$ and U when linked to a group of formula b), c) or e) each independently represent a single covalent bond, —CH$_2$—CH$_2$—, —O—CH$_2$$\cdots$$^{(iv)}$, —NE—CH$_2$$\cdots$$^{(iv)}$, —CH=CH—, —O—CH$_2$—CH$_2$—CH$_2$$\cdots$$^{(iv)}$, or —NE—CH$_2$—CH$_2$—CH$_2$$\cdots$$^{(iv)}$, more preferably a single covalent bond, —CH$_2$—CH$_2$—, —NR—CH$_2$$\cdots$$^{(iv)}$ or —CH=CH—, and most preferably a single covalent bond, —CH$_2$—CH$_2$— or —O—CH$_2$$\cdots$$^{(iv)}$, wherein E and R have the meaning as given above and the broken lines (iv) symbolize the linkage to the groups of formula b), c) or e).

27. A polymerizable dichroic azo dye according to claim 1, wherein $X^1$, $X^2$ and U when linked to a group of formula f) or g) each independently represent —CH$_2$—, —CO—, —CH$_2$—CH$_2$—CH$_2$—, —O—CH$_2$—$_{CH2}$$\cdots$$^{(iv)}$, —NE—CH$_2$—CH$_2$$\cdots$$^{(iv)}$, —CH=CH—CH$_2$$\cdots$$^{(iv)}$, —OCO—CH$_2$$\cdots$$^{(iv)}$ or —CH$_2$—OCO$\cdots$$^{(iv)}$, and preferably —CH$_2$— or —CO—, wherein E has the meaning given above and the broken lines (iv) symbolize the linkage to the groups of formula f) or g).

28. A polymerizable dichroic azo dye according to claim 1, wherein L when linked to two groups of formula d) represents a radical of formula h) to j) shown below,

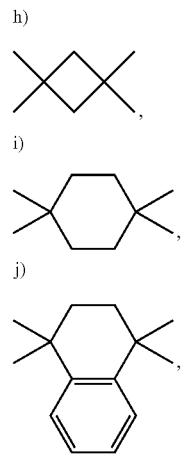

which are unsubstituted, mono- or poly-substituted by fluorine, chlorine, methyl, methoxy, acyl or —CO—O—CH$_3$.

29. A polymerizable dichroic azo dye according to claim 10, wherein $Ar^1$ and $Ar^2$ independently of each other are 1,4-phenylene or 1,4-naphthylene, which are unsubstituted, mono- or disubstituted by fluorine, chlorine, —OCH₃ or —CH₃, with the proviso that at least one of Ar¹ or Ar² is optionally substituted 1,4-naphthylene if G¹ and G² are optionally substituted 1,4-phenylene.

30. A polymerizable dichroic azo dye according to claim 29, wherein Ar¹ and Ar² independently of each other are 1,4-phenylene, which is unsubstituted, mono- or disubstituted by chlorine or —CH₃ or unsubstituted 1,4-naphthylene, with the proviso that at least one of Ar¹ or Ar² is unsubstituted 1,4-naphthylene if G¹ and G² are optionally substituted 1,4-phenylene.

31. A polymerizable dichroic azo dye according to claim 10, wherein G¹ and G² independently of each other are 1,4-phenylene or 1,4-naphthylene, which are unsubstituted, mono- or disubstituted by fluorine, chlorine, —OCH₃ or —CH₃, or a group of formula b), c), d) and e), which are unsubstituted and wherein the broken lines (i) symbolize the linkage to the azo-binding group and R, E have the meaning given above and with the proviso that G¹ does not represent a group of formula d)

b)

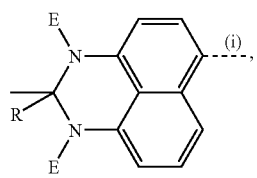

c)

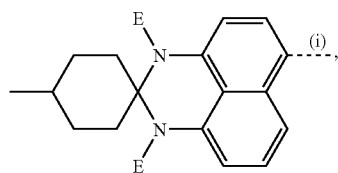

d)

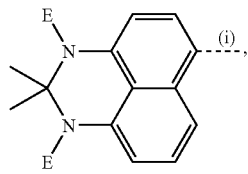

e)

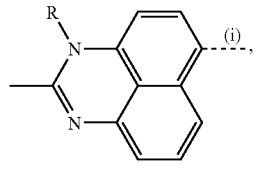

or a group of formula f) and g), which is unsubstituted and wherein the broken lines (i) symbolize the linkage to the azo-binding group and R represents hydrogen or lower alkyl f)

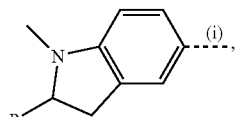

g)

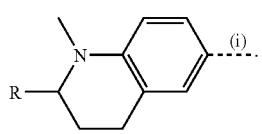

32. A polymerizable dichroic azo dye according to claim 31 wherein G¹ and G² independently of each other are 1,4-phenylene or 1,4-naphthylene, which are unsubstituted, mono- or disubstituted by fluorine, chlorine, —OCH₃ or —CH₃, or a group of formula b), c), d) and e), which are unsubstituted and wherein the broken lines (i) symbolize the linkage to the azo-binding group and R, E have the meaning given above and with the proviso that G¹ does not represent a group of formula d)

b)

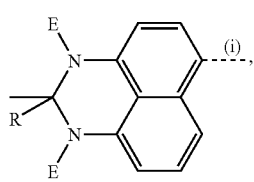

c)

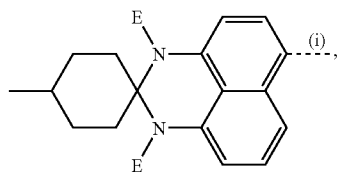

d)

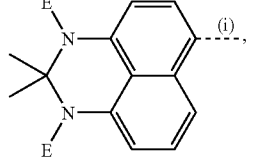

e)

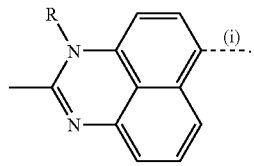

33. A polymerizable dichroic azo, dye of the general formula I:

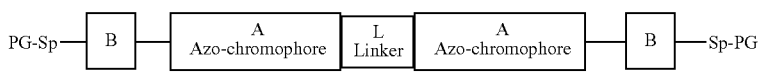

wherein:

A is a dichroic residue of general formulae IV:

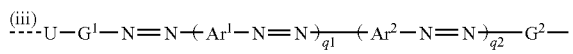

wherein the broken line (iii) symbolizes the linkage to the group B and wherein $G^1$ and $G^2$ independently of each other represent 1,4-phenylene, which is unsubstituted, mono- or disubstituted by chlorine or —$CH_3$ or unsubstituted 1,4-naphthylene; or a group of formula b), c) and d)

b)

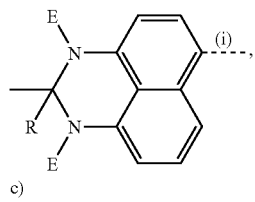

c)

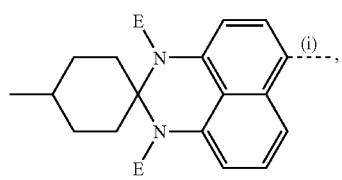

d)

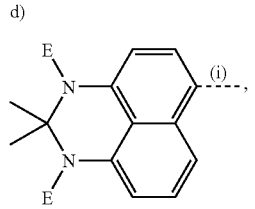

wherein the broken lines (i) symbolize the linkage to the azo-binding group; and wherein R independently represents hydrogen, methyl, ethyl, propyl or isopropyl; E independently represents hydrogen, methyl or acetyl; and with the proviso that $G^1$ does not represent a group of formula d);

$Ar^1$, $Ar^2$ are independently of each other 1,4-phenylene, which is unsubstituted, mono- or disubstituted by chlorine or —$CH_3$ or unsubstituted 1,4-naphthylene, with the proviso that at least one of $Ar^1$ or $Ar^2$ is unsubstituted 1,4-naphthylene if $G^1$ and $G^2$ are optionally substituted 1,4-phenylene;

$q^1$, $q^2$ independently are 0 or 1, with the proviso that the sum of the integers $q^1$ + $q^2$ is 0 or 1;

U when linked to 1,4-phenylene or 1,4-naphthylene represents a single covalent bond, —CO—O—, —O—CO—, —$CH_2$—O—, —O—$CH_2$—, —NR— or —$CH_2$—NR—, —NR—$CH_2$—, —NR—CO— or —CO—NR—, wherein E and R have the meaning given above, or wherein U when linked to a group of formula b) or c) represents a single covalent bond, —$CH_2$—$CH_2$— or —O—$CH_2$— , wherein E and R have the meaning given above and the broken lines (iv) symbolize the linkage to the groups of formula b) or c);

B represents a group of substructure II

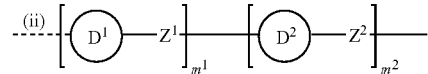

wherein the broken line (ii) symbolizes the linkage to the azo-chromophore A and wherein:

$D^1$ and $D^2$ independently of each other represent 1,4-phenylene, which is unsubstituted, mono- or polysubstituted by fluorine, chlorine, methyl, methoxy, acyl or —CO—O—$CH_3$;

$m^1$, $m^2$ independently ndependently of each other 0 or 1;

$Z^1$ and $Z^2$ independently of each other represent a single covalent bond, —O—, —CO—O—, —O—CO—, —$CH_2$—O— or —O—$CH_2$—;

PG represents $CH_2$=CY—COO—, $CH_2$=CH—O—, $CH_2$=CH—OOC—,

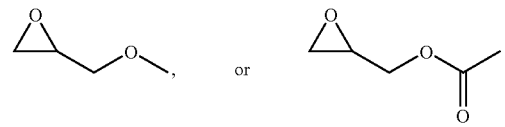

wherein Y is hydrogen or methyl;

Sp represents a single bond, ethylene, propylene, butylene, pentylene, hexylene, heptylene, octylene, nonylene, decylene, undecylene, or dodecylene;

L when linked to two groups of formula d) represents a radical of formula i), which is unsubstituted, mono- or poly-substituted by methyl i)

or represents a group of substructure III $$-X^1-(W)_n-X^2-\qquad\text{III}$$

wherein:
X$^1$ and X$^2$ when linked to 1,4-phenylene or 1,4-naphthylene each independently of each other represent a single covalent bond, —CO—O—, —O—CO—, —CH$_2$—O—, —O—CH$_2$—, —NR— or —CH$_2$—NR—, —NR—CH$_2$—, —NR—CO— or —CO—NR—, wherein E and R have the meaning given above, or when linked to a group of formula b) or c) each independently of each other represent a single covalent bond, —CH$_2$—CH$_2$— or —O—CH$_2$—$^{...(iv)}$, wherein E and R have the meaning given above and the broken lines (iv) symbolize the linkage to the groups of formula b) or c);

W represents ethylene, propylene, butylene, pentylene, hexylene, heptylene, octylene, nonylene, decylene, undecylene, or dodecylene; or 1,4-phenylene, 1,4-naphthylene, 1,5-naphthylene or 2,6-naphthylene, which are unsubstituted, mono- or poly-substituted by fluorine, chlorine, methyl, methoxy, acyl or —CO—O—CH$_3$;

n is 0 or 1.

34. Method for the preparation of a mesogenic polymerizable mixture comprising preparing a mesogenic polymerizable mixture from at least a polymerizable dichroic azo dye according to claim 1 in a concentration in the range of 0.01 to 50% wt in relation to the mixture.

35. A mesogenic, polymerizable mixture comprising at least one polymerizable dichroic azo dye according to claim 1.

36. A mesogenic, polymerizable mixture according to claim 35, wherein the polymerizable dichroic azo dye is at a concentration of 0.01 to 50% wt.

37. A mesogenic, polymerizable mixture according to claim 35 further comprising another dichroic or non-dichroic dye.

38. A mesogenic, polymerizable mixture according to claim 35 further comprising at least one polymerizable liquid crystalline compound (LCP).

39. A mesogenic, polymerizable mixture according to claim 35 further comprising additives which are crosslinkers, stabilizers and photoinitiators.

40. A mesogenic, polymerizable mixture comprising at least one polymerizable dichroic azo dye according to claim 1, and at least one polymerizable liquid crystalline compound and optionally additives which are crosslinkers, stabilizers and photoinitiators.

41. A mesogenic, polymerizable mixture comprising one to four polymerizable dichroic azo dyes according to claim 1, and at least one polymerizable liquid crystalline compound comprising two polymerizable groups and optionally additives which are crosslinkers, stabilizers and photoinitiators.

42. A mesogenic, polymerizable mixture according to claim 35 able to induce a cholesteric phase for the creation of dyed cholesteric layers, comprising either:
   (i) at least one chiral polymerizable liquid crystalline compound, or
   (ii) at least one polymerizable liquid crystalline compound and least one chiral component.

43. Method for the preparation of dichroic liquid crystalline polymer films comprising polymerizing a mesogenic, polymerizable mixture according to claim 35.

44. A dichroic liquid crystalline polymer film comprising a mesogenic, polymerizable mixture according to claim 35.

45. Method for the manufacture of a polarizer or optical filter comprising incorporating a dichroic liquid crystalline polymer film according to claim 44 into a polarizer or optical filter.

46. Process of preparing a dichroic liquid crystalline polymer film comprising a mesogenic, polymerizable mixture according to claim 35 comprising
   (i) preparing a solution of said mesogenic, polymerizable mixture by dissolving said mixture in a solvent
   (ii) applying said solution to a substrate by different coating techniques,
   (iii) evaporating the solvent to obtain a film, and
   (iv) polymerizing said film using UV light to give said dichroic liquid crystalline polymer film.

47. Process according to claim 46, wherein the dichroic liquid crystalline polymer films are further coated with other layers, such as protective layers for protection against oxygen, UV irradiation or mechanical stress.

48. Process according to claim 46, wherein the substrates include transparent substrates, which is glass or plastic, including an orientation layer.

49. Process according to claim 48, wherein said orientation layer includes rubbed polyimide or polyamide.

50. Process according to claim 49, wherein said photo-orientable orientation layers are Linearly Photo-Polymerizable Polymers (LPPs).

51. Multilayer systems formed from a stack of alternating LPP and LCP layers, wherein at least one of the LCP layers is a dichroic liquid crystalline polymer film according to claim 44, and which are optionally covered by other functional layers, which are protection layers against oxygen or humidity or layers for protection against ultraviolet radiation.

52. Process of preparing an orientation layer comprising at least one polymerizable dichroic azo dye according to claim 1, by
   (i) preparing a solution of a mixture comprising at least one polymerizable dichroic azo dye of formula I and a photo-orientable material in a solvent,
   (ii) applying the solution on a substrate using different coating techniques,
   (iii) evaporating the solvent to obtain a film, and
   (iv) polymerizing said film using linearly polarized UV light to give said orientation layer comprising at least one polymerizable dichroic azo dye according to formula I.

53. Method for the preparation of an electro-optical or optical device comprising incorporating an effective amount of a mesogenic, polymerizable mixture according to claim 35 into an electro-optical or optical device.

54. Method for the preparation of an electro-optical or optical device including a security device comprising incorporating a dichroic liquid crystalline polymer film according to claim 44 into an electro-optical or optical device including a security device.

55. Electro-optical or optical components or security devices comprising a dichroic liquid crystalline polymer film formed from a mesogenic, polymerizable mixture according to claim 35.

56. Orientation layer comprising at least one polymerizable dichroic azo dye according to claim 1.

57. Orientation layer according to claim 56 further comprising rubbed polyimide or polyamide.

58. Method for the manufacture of a structured or unstructured optical filter, polarizer or element of a security device comprising incorporating an orientation layer according to claim 56 into a structured or unstructured optical filter, polarizer or element of a security device.

* * * * *